United States Patent [19]

Uemae et al.

[11] Patent Number: 5,424,355
[45] Date of Patent: Jun. 13, 1995

[54] AQUEOUS COATING COMPOSITION

[75] Inventors: Masami Uemae, Hiratsuka; Takeshi Komatsu, Ninomiya; Yoshihiro Maeyama, Chigasaki; Takashi Yamakoshi, Chigasaki; Akira Kume, Yokohama, all of Japan

[73] Assignee: Nippon Carbide Kogyo Kabushiki Kaisha, Tokyo, Japan

[21] Appl. No.: 231,360

[22] Filed: Apr. 20, 1994

Related U.S. Application Data

[63] Continuation of Ser. No. 883,766, May 15, 1992, abandoned.

[30] Foreign Application Priority Data

May 17, 1991 [JP] Japan ................................ 3-140689
Nov. 7, 1991 [JP] Japan ................................ 3-318555

[51] Int. Cl.$^6$ ............................................... C08L 75/00
[52] U.S. Cl. ................................... 524/507; 524/501;
524/502; 524/515; 524/521; 524/522; 524/513;
524/525
[58] Field of Search ............... 524/501, 502, 507, 513,
524/515, 521, 522, 525

[56] References Cited

U.S. PATENT DOCUMENTS 4,134,872  1/1979  Lee ........................................ 524/460

FOREIGN PATENT DOCUMENTS 675578    7/1966  Belgium .
2391234   12/1978 France .
4009775   6/1991  Germany .
53-064287 6/1978  Japan .
52139     4/1979  Japan .
180617    11/1982 Japan .
59-075954 4/1984  Japan .
129213    7/1984  Japan .
62-230868 10/1987 Japan .
63-010678 1/1988  Japan .
63-172777 7/1988  Japan .

OTHER PUBLICATIONS

World Patents Index Latest Sect. Ch, Week 9010, Derwent Publications Ltd., London, GB; Class A, AN 90-073063 & JPC-2-028 269 (Aishin Kako KK) 30 Jan. 1990.

*Primary Examiner*—Peter D. Mulcahy
*Attorney, Agent, or Firm*—Sherman and Shalloway

[57] ABSTRACT

An aqueous coating composition comprising fine polymer particles dispersed in an aqueous medium and an inorganic filler, wherein said fine polymer particles comprise synthetic rubber emulsion polymer particles having a glass transition temperature of 0° C. or less and emulsion polymer particles having a glass transition temperature of 20° C. or more, and further, according to circumstances, urethane emulsion polymer particles. This composition has various properties as a chipping-resistant coating agent in good balance and is particularly useful for coating of the outdoor sheet metal working members of wheeled vehicles.

44 Claims, No Drawings

AQUEOUS COATING COMPOSITION

This application is a continuation of application Ser. No. 07/883,766, filed May 15, 1992, now abandoned.

This invention relates to an aqueous coating composition, and more detailedly, relates to an aqueous dispersion type coating composition such as a mastic coating, a sound insulating coating, a vibration-proof coating or a caulking material, particularly a synthetic rubber emulsion polymer-particles-based chipping-resistant aqueous coating composition which is used for protecting the outdoor sheet metal working members of wheeled vehicles, especially automobiles such as the back side of the flooring, tire houses, chassis, gasoline tanks and suspensions from marring caused by flipped stones, etc, so-called "chipping", and which is excellent in various performances such as resistance to chipping, adhesion to metal working members, uniformity and smoothness of the coat, resistance to water, resistance to gasoline, resistance to impact and sound insulating properties and is further excellent in low-temperature characteristics such as resistance to impact at an extremely low temperature of $-30°$ C. or less.

Heretofore, as aqueous coating materials for resistance to chipping to be used for the outdoor sheet metal working members of wheeled vehicles such as, for example, automobiles, there have been known those each comprising an aqueous resin dispersion such as a rubber latex or an acrylic copolymer emulsion as a vehicle having compounded there into an inorganic filler such as calcium carbonate or talc. For example, those based on acrylic copolymer aqueous resin dispersions are disclosed, for example, in Japanese Published Laid-Open Patent Publication Nos. 64287/1978, 75954/1984, 230868/1987, 10678/1988 and 172777/1988, etc.

However, as for aqueous coating agents for resistance to chipping disclosed in these gazettes, it is not easy to satisfy both various characteristics as chipping-resistant coating agents such as chipping resistance at ordinary temperature (hereinafter, sometimes referred to as "ordinary state chipping resistance"), chipping resistance immediately after being wetted with water (hereinafter, sometimes referred to as "wet chipping resistance"), excellent adhesion to sheet metal working members and impact resistance particularly, impact resistance at extremely low temperatures, e.g. of $-30°$ C. or less (hereinafter, sometimes referred to as "low temperature impact resistance"), and blister prevention properties at the drying step when thick coats, e.g. of 600 μ or more, are formed. Namely, when the quantity of the inorganic filler in the coating agent is reduced aiming to enhance ordinary state chipping resistance and low temperature impact resistance, blister is apt to occur at the baking step, whereas when the quantity of the filler is increased aiming to prevent blister, ordinary state chipping resistance and low temperature impact resistance are strikingly lowered.

Further, recently, in preparation of automobiles, etc., there are often adopted for enhancing their rust resistance, for example, a method which comprises cationically electrodepositing, by "drenching", the wholes of the body, chassis and the like at the time of their assembly, and the like. When such cationically electrodeposited sheet metal working members are coated with chipping-resistant coating agents as disclosed in the above gazettes, adhesion of the coating agents is apt to become insufficient and wet chipping resistance tends to strikingly lower.

On the other hand, chipping-resistant aqueous coating agents wherein rubber latexes are used as vehicles are disclosed in Japanese Laid-Open Patent Publication Nos. 180617/1982, 75954/1984 and 129213/1984, etc.

However, chipping-resistant aqueous coating agents containing latexes disclosed in these gazettes also have problems that any of ordinary state and wet chipping resistance and low temperature impact resistance is not always sufficient.

Further, there are also known chipping-resistant aqueous coating agents using as the vehicle one comprising a rubber latex having compounded therein another copolymer, and, for example, it is proposed in Japanese Laid-Open Patent Publication No. 52139/1979 to use as the vehicle one comprising a styrene-butadiene copolymer resin having compounded therein respectively specific quantities of a vinyl chloride-vinyl acetate-unsaturated dibasic acid copolymer resin and a low molecular weight liquid polymer.

However, it has been revealed that although as a vinyl chloride-vinyl acetate-unsaturated dibasic acid polymer resin, one having a powdery form is usually used in the above laid-open patent publication, the copolymer resin powder is not easy to disperse, and the adhesion of the coat obtained to the sheet metal working member is not sufficient and the chipping resistance thereof is also insufficient.

Further, it is proposed, for example, in Japanese Laid-Open Patent Publication No. 28269/1990 to use as the base resin (vehicle component) in a chipping-resistant aqueous coating agent a copolymer which is formed by emulsion polymerization of styrene, butadiene and an acrylic monomer and whose glass transition temperature is 0° C. or less and whose butadiene content is 5 to 50 weight parts per 100 weight parts of the copolymer.

According to the examples of the above laid-open patent publication, the base resin is prepared by emulsion polymerization of an acrylic monomer in the presence of a styrene-butadiene rubber latex. However, when the present inventors tried to prepare the copolymer according to the process disclosed in the examples, at the time of emulsion polymerization of the acrylic monomer in the presence of the styrene-butadiene rubber latex, the acrylic monomer was graft polymerized with the remaining double bonds deriving from the butadiene units in the rubber latex, and therefore, a copolymer having the desired rubber elasticity was not obtained and only a hard and brittle copolymer was obtained.

Still further, application of a chipping-resistant coating agent onto parts other than the body such as the chassis, gasoline tank and suspensions among automobile parts is generally carried out at lines other than the coating line for bodies, and an attempt to carry out the baking of the coat formed at the former coating lines at a relatively low temperature, e.g. of 100° C. or less is made, especially lately, for the purpose of lowering of automobile manufacture costs. In this situation, it was revealed that although there was an advantage that the problem of blister occurrence was almost avoidable, there was a problem that adhesion of the coating agent to these parts was further lowered.

The present inventors intensely studied aiming at providing a chipping-resistant aqueous coating composition which has in good balance various characteristics as a chipping-resistant coating material such as ordinary state and wet chipping resistances, low temperature impact resistance, adhesion onto base materials, uniformity and smoothness of its coat, water resistance and solvent resistance, and wherein, even when thick coats are formed on sheet metal working memberers such as the body of an automobile to which high temperature baking is made, incoveniences such as blister do not occur at the baking step.

Further, they studied aiming at providing a chipping-resistant aqueous coating composition chiefly used for coating of sheet metal working members such as the aforesaid parts other than the body of automobiles, which composition is one wherein, even when the temperature of baking of the coat formed by application of the composition is set at a relatively low temperature such as, for example, a temperature of 100° C. or less, adhesion of the coat to the surface of the base material being particularly apt to lower is not spoiled, and which has in good balance the above other various characteristics as a chipping-resistant coating agent.

As a result, they found that the above object can be attained by using together, as vehicle components of an aqueous coating composition, a synthetic rubber emulsion polymer having a glass transition temperature (hereinafter, sometimes referred to as Tg) of 0° C. or less and a certain specific emulsion polymer having a relatively high Tg of 20° C. or more (hereinafter, sometimes referred to as high Tg emulsion polymer), and completed this invention. Further, it was found that when an urethane emulsion polymer is used in combination with the above two emulsion polymers, the wet chipping resistance of the resultant aqueous coating composition and adhesion to sheet metal working members (base materials), particularly base materials such as, for example, cationically electrodeposited steel sheets are still further improved.

Thus, according to an aspect of this invention, there is provided an aqueous coating composition comprising fine polymer particles dispersed in an aqueous medium and an inorganic filler, wherein said emulsion polymer particles comprise (A) 50 to 95 weight % of synthetic rubber emulsion polymer particles containing 30 to 90 weight % of a conjugated diolein unit and having a glass transition temperature of 0° C. or less, and (B) 5 to 50 weight % of emulsion polymer particles containing 30 to 99.9 weight % of a unit represented by the formula

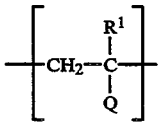

(I)

wherein, $R^1$ represents a hydrogen atom or methyl group, and Q represents $-COOR^2$,

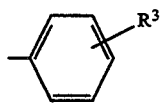

or $-CN$ wherein $R^2$ represents a lower alkyl group and $R^3$ represents a hydrogen atom or lower alkyl group, and having a glass transition temperature of at least 20° C.

Further according to another aspect of this invention, there is provided the above aqueous coating composition wherein said fine polymer further includes, in addition to the above emulsion polymer particles (A) and (B).

(C) 3 to 100 weight % of urethane emulsion polymer particles based on the total quantity of said emulsion polymer particles (A) and (B).

In the present specification, the term "emulsion polymer particles" means fine particles of a polymer dispersed in an aqueous medium, whose average particle size is usually 1 micron or less, preferably on the order of 0.05 to 0.5 micron, and does not necessarily mean polymer particles obtained by emulsion polymerization. Particularly, the above urethane emulsion polymer particles (C) are ordinarily prepared without utilizing emulsion polymerization, as is described later.

The aqueous coating composition of this invention is further detailedly described below.

Synthetic Rubber Emulsion Polymer Particles (A)

The synthetic rubber emulsion polymer particles (A) constituting one component of vehicles in the aqueous coating composition of this invention are composed of a copolymer which contains a conjugated diolefin unit in an amount of 30 to 90 weight %, preferably 40 to 80 weight % and more preferably 45 to 75 weight % based on the weight of the synthetic rubber polymer, and has rubber elasticity.

Such a synthetic rubber copolymer can be formed, according to the same procedure as employed in preparation process known per se for synthetic rubber copolymer latexes, for example, by aqueous emulsion polymerizing under pressure (a-1) a conjugated diolefinic monomer with
(a-2) an aromatic vinyl monomer and/or a vinyl cyanide monomer, preferably together with
(a-3) a carboxyl group-containing ethylenic monomer, and further, if necessary, together with
(a-4) another copolymerizable monomer.

As the conjugated diolefinic monomer (a-1), there can, for example, be mentioned one or two or more of monomers selected from butadiene, isoprene, chloroprene, etc., and butadiene is particularly suitable. Further, as the aromatic vinyl monomer (a-2), there can, for example, be mentioned styrene, α-methylstyrene, vinyltoluene, ethylvinylbenzene, etc., and as the vinyl cyanide monomer (a-2), there can, for example, be mentioned acrylonitrile, methyacrylonitrile, etc. These aromatic vinyl monomers and/or vinyl cyanide monomers (a-2) can be used alone or in combination of two or more of them. Particularly preferred are styrene and/or acrylonitrile.

Further, as the carboxyl group-containing ethylenic monomer (a-3) used in a preferred aspect, there can be mentioned an α,β-ethylenically unsaturated monomer having in one molecule one or two carboxyl groups which can be in a free form or in the form of a salt or anhydride, and there can be exemplified $C_{3-5}$ α,β-unsaturated monocarboxylic acids such as acrylic acid, methacrylic acid and crotonic acid; $C_{4-5}$ α,β-unsaturated dicarboyxlic acids such as citraconic acid, itaconic acid, maleic acid and fumaric acid or their anhydrides or $C_{1-12}$ monoalkyl esters (for example, monoethyl esters mono-n-butyl esters, etc.); or salts of these carboxylic acids (for example, ammonium salts, alkali metal salts, etc.). These monomers can also be used alone or in combination of two or more. Among these carboxyl group-containing ethylenic monomers, acrylic acid, methacrylic acid and itaconic acid can be mentioned as particularly preferred ones.

Although synthetic rubber emulsion polymer particles used in this invention can be prepared by copolymerizing a conjugated diolefinic monomer (a-1) with an aromatic vinyl monomer and/or a vinyl cyanide monomer (a-2) as requisite monomer components, preferably in combination with a carboxyl group-containing ethylenic monomer, those components being described above, another monomer can also be copolymerized therewith, if necessary, as is often carried out in preparation of synthetic rubber copolymer latexes.

Examples of such another copolymerizable monomer (a-4) are as follows.

① Esters of acrylic acid or methacrylic acid:

For example, $C_{1-18}$ alkyl esters of acrlic acid or methacrylic acid such as methyl acrylate, ethyl acrylate, n-butyl acrylate, isobutyl acrylate, n-octyl acrylate, i-octyl acrylate, 2-ethylhexyl acrylate, isononyl acrylate, methyl methacrylate, ethyl methacrylate, n-butyl methacrylate, isobutyl methacrylate, n-hexyl methacrylate, n-octyl methacrylate and n-dodecyl methacrylate.

② Radical-polymerizable unsaturated monomers containing at least one crosslinkable functional group:

For example, amides of $\alpha,\beta$-unsaturated carboxylic acids or derivatives Of the amides such as acrylamide, methacrylamide, diacetoneacrylamide, N-methylolacrylamide and N-methylolmethacrylamide; esters of $\alpha,\beta$-unsaturated carboxylic acids with epoxy group-containing saturated alcohols such as glycidyl acrylate and glycidyl methacrylate; esters of $\alpha,\beta$-unsaturated carboxylic acids with polyhydric saturated alcohols such as 2-hydroxyethyl acrylate, 2-hydroxypropyl acrylate, 2-hydroxyethyl methacrylate and 2-hydroxypropyl methacrylate; esters of $\alpha,\beta$-unsaturated carboxylic acids with amino-group-containing saturated alcohols such as dimethylaminoethyl methacrylate and diethylaminoethyl methacrylate; monomers having two or more radical-polymerizable unsaturated groups such as divinylbenzene, diallyl phthalate, triallyl cyanurate, ethylene glycol dimethacrylate, 1,4-butanediol diacrylate, 1,6-hexanediol diacrylate, diethylene glycol dimethacrylate and allyl methacrylate; etc.

Although the use ratio of the thus described monomer components (a-1) to (a-4) can be varied over a wide range in accordance with physical properties required for synthetic rubber emulsion polymer particles, etc., the ratio is, usually, in the following range.

| Monomer | General range (weight %) | Preferred range (weight %) | More preferred range (weight %) |
|---|---|---|---|
| (a-1) | 30–90 | 40–80 | 45–75 |
| (a-2) | 10–70 | 15–55 | 20–50 |
| (a-3) | 0.1–10 | 0.5–5 | 1–4 |
| (a-4) | 0–20 | 0–10 | 0–5 |

Note: Weight % is a percentage based on the total quantity of the monomers

Synthetic rubber latex polymer particles (A) can be prepared by emulsion polymerizing monomer components (a-1) to (a-4) thus described, in the same procedure as in a preparation method for synthetic rubber latex known per se, namely in an aqueous medium in the presence of a surfactant and if necessary in the coexistence of a protective colloid at a temperature of about 30° to about 100° C., preferably about 40° to about 90° C., and usually under pressure.

As the surfactant, any of nonionic, anionic, cationic and amphoteric surfactants can be used. Examples of nonionic surfactants are polyoxyalkylene alkyl ethers such as polyoxyethylene lauryl ether and polyoxyethylene stearyl ether; polyoxyalkylene alkylphenol ethers such as polyoxyethylene octylphenol ether and polyoxyethylene nonylphenol ether; sorbitan fatty acid esters such as sorbitan monolaurate, sorbitan monostearate and sorbitan trioleate; polyoxyalkylene sorbitane fatty acid esters such as polyoxyethylene sorbitan monolaurate; polyoxyalkylene fatty esters such as polyoxyethylene monolaurate and polyoxyethyelene monostearate; glycerol fatty acid esters such as oleic acid monoglyceride and stearic acid monoglyceride; polyoxyethylene polyoxypropylene block copolymer; etc. Examples of anionic surfactants are fatty acid salts such as sodium stearate, sodium oleate and sodium laurate; alkylarylsulfonic acid salts such as sodium dodecylbenzenesulfonate, alkyl sulfate ester salts such as sodium lauryl sulfate; alkyl sulfosuccinic acid salts and their derivatives such as dioctyl sodium sulfosuccinate and polyoxyethylene lauryl sodium sulfosuccinate; polyoxyalkylene alkyl ether sulfate ester salts such as sodium polyoxyethylene lauryl ether sulfate; polyoxyalkylene alkylaryl ether sulfate ester salts such as sodium polyoxyethylene nonylphenol ether sulfate; etc. Examples of cationic surfactants are alkylamine salts such as laurylamine acetate; quaternary ammonium salts such as lauryltrimethylammonium chloride and alkylbenzyldimethylammonium chloride; polyoxyethylenealkylamine; etc. Examples of amphoteric surfactants are alkylbetaines such as laurylbetaine; etc. Further, there can also be used surfactants comprising respectively the above various kinds of surfactants wherein part of hydrogens of the alkyl groups(s) was replaced by fluorine atom(s); so-called reactive surfactants comprising respectively the above various kinds of surfactants which have radical copolymerizable unsaturated bond(s) in the molecular structure of these surfactants.

Among these surfactants, preferably used in view of smallness of occurrence of agglomerate at the time of emulsion polymerization, etc. are polyoxyalkylene alkyl ethers and polyoxyalkylene alkylphenol ethers as nonionic surfactants; and alkylarylsulfonic acid salts, alkyl sulfate salts, alkyl sulfosuccinate ester salts and their derivates, polyoxyalkylene alkyl ether sulfate ester salts, polyoxyalkylene alkylphenol ether sulfate ester salts as anionic surfactants; etc. These surfactants can be used alone or in appropriate combination.

Although the use quantity of these surfactants can be varied in accordance with the kind of the surfactants to be used, etc., the quantity can generally be in the range of about 0.5 to about 10 weight parts per 100 weight parts in total of the monomer components (a-1) to (a-4). However, it is preferred to use them in the range of about 1 to 6 weight parts, particularly about 1 to 4 weight parts in view of polymerization stability in aqueous emulsion polymerization, the storage stability and chipping resistance of synthetic rubber polymer emulsions formed, and the excellence of adhesion to base materials such as sheet metal working members when the synthetic rubber polymer emulsions were used in aqueous coating compositions, etc.

Further, examples of protective colloids usable in preparation of the synthetic rubber polymer emulsion are polyvinyl alcohols such as partially saponified polyvinyl alcohol, completely saponified polyvinyl alcohol and modified polyvinyl alcohols; cellulose derivatives such as hydroxyethylcellulose, hydroxypropylcellulose and carboxymethylcellulose salts; natural polysaccharides such as guar gum; etc.

Although the use quantity of these protective colloids is not strictly limited, either and can be varied in accordance with their kind, etc., the quantity can usually be exemplified as a quantity of the order of 0 to 3 weight parts per 100 weight parts in total of the monomer components (a-1) to (a-4).

The emulsion polymerization of the above monomer components (a-1) to (a-4) is carried out using a polymerization initiator. Examples of usable polymerization initiators are persulfate salts such as ammonium persulfate, sodium persulfate and potassium persulfate; organic peroxides such as t-butyl hydroperoxide, cumene hydroperoxide and p-menthane hydroperoxide; hydrogen peroxide; etc., and these can be used alone or in combination of plural thereof.

Although the use quantity of the above polymerization initiators is not strictly limited and can be varied over a wide range in accordance with their kind, reaction conditions, etc., the quantity can, generally for example, be about 0.05 to about 1 weight part, preferably about 0.1 to about 0.7 weight part and more preferably about 0.1 to about 0.5 weight part per 100 weight parts in total of the monomer components (a-1) to (a-4).

Further, in the emulsion polymerization, a reducing agent can, if necessary, be used together. Examples of usable reducing agents can be reducing organic compounds such as, for example, ascorbic acid, tartaric acid, citric acid and glucose; and reducing inorganic compounds such as, for example, sodium thiosulfate, sodium sulfite, sodium bisulfite and sodium metabisulfite. Although the use quantity of these reducing agents is not particularly limited, either, the quantity can, generally for example, be in the range of about 0.05 to about 1 weight part per 100 weight parts in total of the monomers (a-1) to (a-4).

Further in the emulsion polymerization, a chain transfer agent can, if desired, be used, too. Examples of such chain transfer agents can be cyanoacetic acid; $C_{1-8}$ alkyl esters of cyanoacetic acid; bromoacetic acid; $C_{1-8}$ alkyl esters of bromoacetic acid; polycyclic aromatic compounds such as anthracene, phenanthrene, fluorene and 9-phenylfluorene; aromatic nitro compounds such asp-nitroaniline, nitrobenzene, dinitrobenzene, p-nitrobenzoic acid, p-nitrophenol and p-nitrotoluene; benzoquinone and its derivatives such as benzoquinone and 2,3,5,6-tetramethyl-p-benzoquinone; borane derivaties such as tributylborane; halogenated hydrocarbones such as carbon tetrabromide, carbon tetrachloride, 1,1,2,2-tetrabromoethane, tribromoethylene, trichloroethylene, bromotrichloromethane, tribromomethane and 3-chloro-1-propene; aldehydes such as chloral and furaldehyde; $C_{1-18}$ alkyl mercaptans such as n-dodecyl mercaptan; aromatic mercaptans such as thiophenol and toluene mercaptan; mercaptoacetic acid; $C_{1-10}$ alkyl esters of mercaptoacetic acid; $C_{1-12}$ hydroxyalkyl mercaptans such as 2-mercaptoethanol; terpenes such as pinene and terpinolene; etc.

When the chain transfer agent is used, its use quantity is preferably in the range of about 0.005 to about 3.0 weight parts per 100 weight parts in total of the monomers (a-1) to (a-4).

A synthetic rubber polymer emulsion (latex) formed by the above-described emulsion polymerization can, generally, contain solid components in the range of 10 to 70 weight %, preferably 30 to 65 weight % and more preferably 40 to 60 weight %. Further, it is desirable that the viscosity thereof when measured at 25° C. and 20 rpm using a B-type rotational viscometer is usually 10,000 cps or less, particularly in the range of about 50 to about 5,000 cps. It is desirable that the above emulsion has a pH in the range of usually 2 to 10, particularly 5 to 9, and pH adjustment can be carried out using, for example, ammonia water, an aqueous amine solution or an aqueous alkali hydroxide solution.

The synthetic rubber emulsion polymer particles (A) used in the aqueous coating composition of this invention can be such that their Tg is 0° C. or less, preferably −10° C. or less and more preferably in the range of −20° to −80° C. Coats formed from aqueous coating compositions prepared using synthetic rubber emulsion polymer particles whose Tg is higher than 0° C. have low chipping resistance in general and thus are not so preferred.

In the present specification, the glass transition temperature (Tg) of polymer particles is a value when measured by the following method.

Glass Transition Point (Tg)

About 10 mg of a sample of a (co)polymer emulsion is weighed and put in a cylindrical cell having an inner diameter of about 5 mm and a depth of about 5 mm made of aluminum foil about 0.05 m thick and dried at 100° C. for 2 hours to give a measurement sample. The difference in specific heat capacity of the sample between before and after the glass transition temperature is measured at a temperature elevation rate of 10° C./min. starting from −150° C. using a differential scanning calorimeter (Model SSC-5000 produced by Seiko Instruments Inc.), and Tg is determined from the result.

Further, it is desirable that the above synthetic rubber emulsion polymer particles generally have a gel fraction in the range of 60 to 98 weight %, particularly 70 to 95 weight %.

In the present specification, the gel fraction of the synthetic rubber emulsion polymer particles (A) is a value when measurement is carried out according to the following method.

Gel Fraction

A film of a synthetic rubber polymer emulsion is prepared under drying at room temperature, put into about 200 to 800 volumes of toluene, left as it is, and then filtered using No. 2 filter paper. The filtrate is subjected to vacuum drying at 70° C. and the residue is weighed to determine the toluene-soluble components (weight %) of the polymer emulsion film. Gel fraction is defined as a value obtained by subtracting the toluene-soluble components (weight %) from 100%, namely toluene-insoluble components (weight %).

Further, it is desirable that the average particle size (hereinafter, sometimes merely referred to as particle size) of synthetic rubber polymer particles (A) dispersed in an emulsion prepared in the above way is generally in the range of 0.05 to 0.5 micron, particularly 0.1 to 0.3 micron. Control of the particle size of polymer particles in the emulsion can, for example be carried out by appropriately selecting the kind and quantity of the surfactant used, and further polymerization temperature, etc.

In the present specification, the average particle size of polymer particles is one measured by the DLS method disclosed in "Shin Jikken Kagaku Koza Kiso Gijutsu Hikari (II)" (New Experimental Chemistry Course 4 —Fundamental Techniques 3—Light (II)), pages 725 to 741 (published by Maruzen Co., Ltd. on Jul. 20, 1976), and specifically is a value measured and determined according to the following method.

Average Particle Size

A (co)polymer emulsion is diluted 50,000 to 150,000-fold with distilled water, and about 10 ml of the dilution after sufficient mixing by stirring is sampled into a 21 mm$\phi$ glass cell using a Pasteur Pipette. Then, the cells is set in the prescribed position in a dynamic light scattering photometer DLS-700 (produced by Otsuka Denshi Co., Ltd.), and measurement is carried out under the following conditions.

| Measurement condition | |
|---|---|
| Measurement temperature | 25 ± 1° C. |
| Clock rate | 10 μsec |
| Correlation channel | 512 |
| Integrated number of measurement | 200 Times |
| Light scattering angle | 90° |

The results of measurement are computer treated to give average particle size.

As synthetic rubber emulsion polymer particles (A), there can also be used, in addition those prepared in the aforedescribed manner, for example, styrene-butadiene series synthetic rubber latexes (hereinafter, sometimes abbreviated as SBR) placed on the market under the trade names of LX-407C (produced by Nippon Zeon Co., Ltd.), and SN-318, SN-534, SN-562 and J-1666 (those are produced by Sumitomo Dow Co., Ltd.), SK-80 (produced by Takeda Chemical Industries, Ltd.), L-2001 and L-2337 (those are produced by Asahi Chemical Industry Co., Ltd.), polylac 707 (produced by MITSUI TOATSU CHEMICALS, INC.), etc.; acrylonitrile-butadiene series synthetic rubber latexes (hereinafter, sometimes abbreviated as NBR) placed on the market under the trade names of Nipol 1571, Nipol 1551 and Nipol 1562 (those are produced by Nippon Zeon Co., Ltd.); etc.

High Tg Emulsion Polymer Particles (B)

In the aqueous coating composition of this invention, the high Tg emulsion polymer particles (B) used, as a vehicle component, in combination with the above synthetic rubber emulsion polymer particles (A) are composed of a (co)polymer which contains the repeat unit represented by the formula

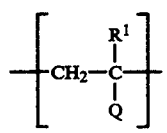

(I)

wherein, $R^1$ represents a hydrogen atom or methyl group, and Q represents —COOR$^2$,

or —CN wherein $R^2$ represents a lower alkyl group and $R^3$ represents a hydrogen atom or lower alkyl group, in the amount of 30 to 99.9 weight %, preferably 35 to 99.5 weight % and more preferably 40 to 99 based on the weight of the polymer, and can further, if necessary, contain one or two or more other monomer units. In the above, the term "lower" means that the carbon number of the group or compound to which this word was attached is 6 or less, preferably 4 or less.

Suitable examples of such monomer units are repeat units derived from the later-described carboxyl group-containing ethylenic monomers, and the (co)polymer can contain such a unit preferably by 0.1 to 10 weight %, more preferably by 0.5 to 5 weight %. Further, the (co)polymer can contain a repeat unit derived from the later-described hydroxyl group-containing ethylenic monomer preferably by 1 to 20 weight %, particularly 3 to 15 weight %.

Such a (co)polymer can, for example, be prepared by emulsion polymerizing (b-1) an ethylenic monomer which is represented by the formula

(II)

wherein $R^1$ and Q are as defined above, and whose homopolymer is hydrophobic and has a Tg of 40° C. or more, with (b-2) a carboxyl group-containing ethylenic monomer, preferably together with (b-3) a hydroxyl group-containing ethylenic monomer, and further, if necessary, together with (b-4) another copolyermizable monomer.

Examples of the above monomer (b-1) are $C_{1-4}$ alkyl esters of methacrylic acid such as methyl methacrylate, ethyl methacrylate, isobutyl methacrylate; aromatic vinyl compounds such as styrene, α-methylstyrene, vinyltoluene and ethylvinylbenzene; (meth)acrylonitrile; etc. Preferred as monomers (b-1) among them are methyl methacrylate, styrene and acrylonitrile in view of easiness of obtainment, easiness of emulsion polymerization, etc. These monomers can be used alone respectively or in combination of two or more of them.

As the carboxyl group-containing ethylenic monomer (b-2), there can be used the same monomer with the carboxyl-containing ethylenic monomer (a-3) previously described in preparation of the aforedescribed synthetic rubber polymer. Preferred as such monomers (b-2) are acrylic acid, methacrylic acid and itaconic acid, as is the case with the monomer (a-3).

Further, hydroxyl group-containing ethylenic monomers (b-3) include α,β-ethylenically unsaturated monomers each having 1 to 4, preferably only one hydroxyl group(s) in one molecule, and there can, for example, be exemplified $C_{2-4}$ hydroxyalkyl esters of (meth)acrylic acid such as 2-hydroxyethyl (meth)acrylate and 2-hydroxypropyl (meth)acrylate.

Further, as another copolymerizable monomer which can be used if necessary, there can further be used, besides the monomers ① and ② mentioned above as examples of "another copolymerizable monomer (a-4)" in preparation of the aforesaid synthetic rubber copolymer, ③ for example, $C_{1-12}$ saturated fatty acid vinyl monomers such as vinyl formate, vinyl acetate, vinyl propionate and vinyl Versatate (trade name); monoolefin monomers such as ethylene, propylene, n-butylen and i-butylene; conjugated diolefinic monomers such as butadiene, isoprene and chloroprene; di-$C_{1-12}$ alkyl ester monomers of $C_{4-5}$ unsaturated $\alpha,\beta$-dicarboxylic acids such as dibutyl maleate, dioctyl maleate, dibutyl fumarate, dioctyl fumarate, dibutyl itaconate and dioctyl itaconate; etc.

The aforesaid monomers can be used alone respectively or in combination of two or more of them. These monomers can appropriately be selected in accordance with physical properties which polymers to be formed are desired to have, for example Tg, but preferred among them are vinyl acetate, vinyl Versatate (trade name) and butadiene.

Preparation of emulsion polymer particles (B) from the thus described monomers (b-1) to (b-4) can be carried out in the same emulsion polymerization method as stated above in preparation of the synthetic rubber latex polymer particles (A), usually by emulsion polymerization the monomers under atmospheric pressure.

As the high Tg emulsion polymer particles (B) used, as a vehicle component, in combination with the aforesaid synthetic rubber emulsion copolymer particles (A) in the aqueous coating composition of this invention, those having Tg of at least 20° C. are used. It is desirable that the glass transition temperature (Tg) required for the polymer particles (B) is adjusted in accordance with the baking temperature of a coat formed from the final coating composition. For example, in case of a coating composition for low temperature baking for which a baking temperature of about 60° to about 100° C. is adopted, it is convenient that the Tg of the polymer particles (B) used is the range of from 20° C. to under 60° C., preferably from 30° C. to 55° C., whereas in case of a coating composition for high temperature baking for which a baking temperature of about 120° to about 160° C. is adopted, it is desirable that the Tg of the polymer particles (B) to be compounded thereinto is generally 60° C. or more, preferably 70° C. or more, and more preferably 85° C. or more.

Thus, the aforesaid monomers (b-1) to (b-4) can be emulsion polyerized for preparation of high Tg polymer particles (B), after such selection of the kind and use ratio of each monomer that the above Tg is satisfied. As the general range of the use ratio of these monomers, the following range can be exemplified.

| Monomer (b-1): | 30 to 99.9 weight % |
| Monomer (b-2): | 0.1 to 10 weight % |
| Monomer (b-3): | 0 to 30 weight % |
| Monomer (b-4): | 0 to 70 weight % |

Note: Weight % is a percentage based on the total quantity of the monomers

Preferred use ratio of each monomer component can be selected in the following ranges depending on the use (for low temperature baking or high temperature baking) of the aqueous coating composition into which the polymer particles (B) formed are compounded.

(1) In case of high Tg polymer particles (B) to be used in aqueous coating compositions for low temperature baking:

| Monomer | Preferred range (weight %) | More preferred range (weight %) |
|---------|---------------------------|--------------------------------|
| (b-1) | 35–80 | 40–75 |
| (b-2) | 0.5–5 | 1–4 |
| (b-3) | 1–20 | 3–15 |
| (b-4) | 15–63.5 | 20–55 |

(2) In case of high Tg polymer particles (B) to be used in aqueous coating compositions for high temperature baking:

| Monomer | Preferred range (weight %) | More preferred range (weight %) |
|---------|---------------------------|--------------------------------|
| (b-1) | 45–98.5 | 60–96 |
| (b-2) | 0.5–5 | 1–4 |
| (b-3) | 1–20 | 3–15 |
| (b-4) | 0–30 | 0–25 |

A (co)polymer emulsion formed by emulsion polymerization of these monomers (b-1) to (b-4) can contain the polymer particles (B), as a solid component, in the range of generally 10 to 70 weight %, preferably 30 to 65 weight % and more preferably 40 to 60 weight %, and it is suitable that its viscosity measured at 25° C. and 20 rpm using a B-type rotational viscometer is usually 10,000 cps or less, particularly in the range of about 10 to about 5,000 cps.

The above emulsion, desirably, has a pH in the range of usually 2 to 10, particularly 5 to 9, and adjustment of pH can be carried out using, for example, ammonia water, an aqueous amine solution or an aqueous alkali hydroxide solution.

Desirably, the high Tg emulsion polymer particles (B) have a weight average molecular weight of generally 500,000 or more, particularly 800,000 or more. Further, the average particle size of the polymer particles (B) dispersed in the polymer emulsion is in the range of generally 0.05 to 0.5 micron, particularly 0.1 to 0.3 micron, and control of the particle size of the high Tg polymer particles (B) can be carried out in the same manner as in control of the particle size of the synthetic rubber emulsion polymer particles (A).

Urethane Emulsion Polymer Particles (C)

As the urethane emulsion polymer particles (C) which can suitably be compounded into the aqueous coating composition of this invention, there can be used urethane polymer emulsions known per se in the coating field, adhesive field, etc.

Such an urethane polymer emulsion can be prepared, according to usual methods, by reacting a chain extender with an urethane prepolymer having isocyanato group(s) at the turmini obtained from a polyisocyanate compound and a polyol compound and emulsifying the resultant reaction mixture.

Examples of polyisocyanate compounds usable in preparation of urethane emulsion polymers (C) are aromatic polyisocyanate compounds such as 1,3- or 1,4-phenylene diisocyanate, 2,4- or 2,6-tolylene diisocyanate, 1,5-naphtylene diisocyanate, 4,4'-diphenylmethane diisocyanate, 3,3'-dimethyldiphenylmethane-4,4'-diisocyanate and 1,3-xylylene diisocyanate; aliphatic polyisocyanate compounds such as 1,4-tetramethylene diisocyanate, 1,6-hexamethylene diisocyanate, 2,2,4-trimethyl-1,6-hexamethylene diisocyanate, 1,8-octamethylene diisocyanate and 1,10-decamethylene diisocyanate; alicyclic polyisocyanate compounds such as 1,3- or 1,4-cyclohexylene diisocyanate, 1-methylcyclohexane-1,3- or 1,4-disocyanate, 4,4'-dicyclohexylmethane diisocyanate, isophorone diisocyanate and 1,3-isocyanomethylcyclohexane; etc. Preferred among these polyisocyanate compounds are, for example, 2,4- or 2,6-tolylene diisocyanate, 1,4-tetramethylene diisocyanate, 1,6-hexamethylene diisocyanate, and isophorone diisocyanate.

Polyol compounds to be reacted with the above polyisocyanate compounds include polyester polyols, polyether polyols and polyester ether polyols. Examples of polyester polyols are condensates of polyhydric alcohols such as, for example, ethylene glycol, propylene glycol, 1,4-butanediol, 1,6-hexanediol, glycerol, trimethylolpropane, pentaerythritol, sorbitan and sorbitol with polyvalent carboxylic acids such as, for example, succinic acid, adipic acid, sebacic acid, maleic acid, fumaric acid, mesaconic acid, citraconic acid, itaconic acid, glutaric acid, phthalic acid, isophthalic acid, terephthalic acid, pyromellitic acid, trimellitic acid and dodecanedicarboxylic acid; lactone polymerization products; etc. Examples of polyether polyols are polyalkylene glycols such as polyethylene glycol, polypropylene glycol, polytetramethylene glycol and polyethylene polypropylene glycol. Further, examples of polyester ether polyols are adducts of the above polyester polyols to alkylene oxides such as ethylene oxide; those having hydroxyl groups at the termini obtained by condensation of the above polyether polyols with the above polycarboxylic acids; etc.

As the chain extenders, there can be used compounds having at least two functional groups containing an active hydrogen atom reactive with an isocyanate group, and representative examples thereof are water, polyhydric alcohols, primary and secondary polyvalent amines, hydrazine and its derivatives, etc.

Examples of the polyhydric alcohols are aliphatic diols such as ethylene glycol, diethylene glycohol, triethylene glycol, tetraethylene glycol, 1,2- or 1,3-propylene glycol, 1,2- 1,3- or 1,4-butylene glycol, 2,2-dimethyl-1,3-propylene glycol, 1,6-hexanediol and 2,2,4-trimethyl-1,3-pentanediol; alicyclic diols such as 2,2,4,4-tetramethylcyclobutanediol, 1,3-cyclopentanediol and methylenebis(4-cyclohexanol); aromatic diols such as 1,4-phenylene bis(2-hydroxyethyl ether) and 1,2-propylene glycol bis(2-hydroxyphenyl ether); etc. Examples of polyvalent amines are ethylenediamine, hexamethylenediamine, isophoronediamine, diaminodiphenylmethane, diethylenetriamine, etc; and examples of derivatives of hydrazine are substituted hydrazines such as dimethylhydrazine and 1,6-hexamethylenebishydrazine; reaction products of dicarboxylic acids, disulfonic acids, lactones or polyhydric alcohols with hydrazine; etc.

As the chain extender, there can particularly be mentioned, besides them, those used in emulsification of urethane prepolymers or urethane resins for bestowing ionic properties on them, and specific examples thereof are dihydroxycarboxylic acids such as 2,2-dimethylolacetic acid, 2,2-dimethylolpropionic acid, 2,2-dimethylolbutyric acid and 2,2-dimethylovaleric acid; diaminocarboxylic acids such as 2,5-diaminobenzoic acid, $\alpha,\epsilon$-diaminocaproic acid (lysine) and 2-amino-5-guanidinovaleric acid (arginine); alkyldialkanolamines such as methyldiethanolamine; etc.

The above urethane prepolymer having isocyanate group(s) at the termini can, for example, be prepared by using the above polyisocyanate compound and the above polyol compound in such a rate that isocyanato groups are equivalently excess compared to hydroxyl groups and reacting them in an organic solvent, if necessary in the presence of a catalyst, at a temperature of about 25° to 110° C. with stirring under a nitrogen atmosphere. Examples of usable organic solvents are ketones such as acetone and methyl ethyl ketone; ethers such as dioxane and tetrahydrofuran; esters such as ethyl acetate; aliphatic hydrocarbons such as heptane and octane; alicyclic hydrocarbons such as cyclohexane and methylcyclohexane; etc. Further, examples of useful reaction catalysts are tertiary amines such as triethylamine; inorganic salts such as stannous chloride; organic metal compounds such as di-n-butyltin dilaurate; etc.

Preparation of an urethane polymer emulsion from the thus prepared urethane prepolymer and a chain extender can be carried out using various methods so far known per se.

As preparation processes for a cationic emulsion, there can, for example, be mentioned (1) a process which comprises either converting an urethane prepolymer having isocyanate group(s) at the termini to a polymer using a diol having a tertiary amino group as a chain extender and then cationizing the polymer with a quaternary amino group-giving agent or an acid, a cationizing the prepolymer by reacting it with a diol having a quaternary amino group as a chain extender, (2) a process which comprises converting an urethane prepolymer having isocyanate group(s) at the termini to a polymer using a polyalkylene polyamine as a chain extender and then reacting epihalohydrin and an acid with the polymer to cationize the polymer, etc.

Further, as preparation processes for an anionic emulsion, there can, for example, be mentioned (3) a process which comprises converting an urethane prepolymer having isocyanate group(s) at the termini to a polymer using a dihydroxycarboxylic acid or diaminocarboxylic acid as a chain extender, and then anionizing the polymer by neutralizing it with an alkaline compound, (4) a process which comprises sulfonating an urethane prepolymer having isocyanate group(s) at the termini obtained from a hydrophobic polyol and an aromatic polyisocyanate, and then anionizing the sulfonated product by neutralizing it with a tertiary amine, etc.

Further, as preparation processes for a nonionic emulsion, there can, for example, be mentioned (5) a process which comprises dispersing an urethane prepolymer having isocyanate group(s) at the termini, using an emulsifier, into an aqueous solution, if necessary, containing a diamine or the like to chain extend the prepolymer with the water or the diamine, (6) a process which comprises reacting an urethane prepolymer having isocyanate group(s) at the termini with an alkylene oxide condensate of a long chain alcohol (a kind of nonionic surfactants) and an amine having a hydrophilic group such as a hydroxyl group, (7) a process which comprises reacting an urethane prepolymer having isocyanate group(s) at the termini with the above chain extender to give an urethane resin, and mechanically dispersing the urethane resin into water with an emulsifier, etc.

As urethane polymer emulsions usable in this invention, there can also be used, besides those described above, those obtained by introducing into an urethane prepolymer a hydroxyl group-containing vinyl monomer such as, for example, 2-hydroxyethyl acrylate, and then emulsion copolymerizing the resultant urethane prepolymer with the aforesaid (meth)acrylic monomer; those obtained by blocking part if the isocyanate groups of an urethane prepolymer having isocyanate groups at the termini with one of various blocking agents, or by reacting the urethane prepolymer or an urethane resin with an urethane prepolymer wherein part of this isocyanate groups was blocked, and then emulsifying the resultant urethane prepolymer or urethane polymer containing blocked isocyanate group(s) in the molecule in the same manner as above; etc.

It is preferred to use, among them, anionic or nonionic emulsions as urethane polymer emulsions in view of mixing stability with the afore-mentioned synthetic rubber emulsion polymer particles (A) and high Tg emulsion polymer particles (B), easiness of preparation of coating compositions, storage stability of final coating compositions, etc.

Further, it is desirable that the average particles size of polymer particles in urethane polymer emulsions prepared in the above way is in the range of generally 0.05 to 0.5 micron, preferably 0.1 to 0.3 micron.

Further, it is desirable, in view of prevention of blister occurrence at the time of baking of coats formed using final coating compositions and improvement of wet chipping resistance, etc., that the urethane emulsion polymer particles (C) are such that the larger of the stress at 100% elongation (hereinafter, sometimes referred to as "100% modulus") of a film formed from an urethane polymer emulsion containing the polymer particles (C) and the yield value of the film before 100% elongation is generally 20 kg/cm$^2$ or more, preferably 30 kg/cm$^2$ or more, more preferably in the range of 40 to 300 kg/cm$^2$.

In this specification, the 100% modulus and yield value of a film formed from an urethane polymer emulsion and values measured by the following methods.

Method of Measurement of The 100% Modulus and Yield Value of a Film

An urethane polymer emulsion is applied, with a doctor blade, onto a release paper horizontally fixed so that to dryness thickness becomes 50 to 100 μ, dried at room temperature, and heat treated at 120° C. for 10 minutes using a hot air circulation dryer to give an urethane polymer film. The film is left as it is under a constant temperature and constant humidity condition of 23° C. and 65% RH for 3 hours or longer, and then subjected measurement of its stress-strain curve under the same condition as above, and requisite values are read from the curve.

In this measurement, "Tensilon UTM-4-100" (produced by Toyo Baldwin Co., Ltd.) was used under the conditions of a sample width of 10 mm, grasp intervals of 10 mm and a tension rate of 100 mm/min.

Aqueous Coating Composition

The aqueous coating composition of this invention can be prepared by compounding an inorganic filler into the synthetic rubber polymer emulsion (A) and high Tg polymer emulsion (B) prepared by the above-mentioned way.

The compounding quantities of the polymer emulsions (A) and (B) can be, based on the total quantity of the polymer particles (A) and (B) (namely, solid components) in these emulsions, in the range of 50 to 95 weight %, preferably 55 to 90 weight % and more preferably 60 to 85 weight % in respect of the synthetic rubber emulsion polymer particles (A), and in the range of 5 to 50 weight %, preferably 10 to 45 weight % and more preferably 15 to 40 weight % in respect of the high Tg emulsion polymer particles (B).

Further, the afore-mentioned urethane polymer emulsion (C) can, if necessary, be compounded into the above aqueous coating composition, and thereby it is possible to still further enhance the wet chipping resistance of the coat formed from the resultant coating composition and adhesion of the coat to base materials, particularly cationically electrodeposited steel sheets. Its compounding quantity can be in the range of 3 to 100 weight % as the solid component, namely urethane emulsion polymer particles, based on the total quantity of the synthetic rubber emulsion polymer particles (A) and high Tg emulsion polymer particles (B). The compounding quantity is preferably in the range of 20 to 90 weight %, particularly 30 to 80 weight % in case of the aqueous coating composition for low temperature baking, and is preferably in the range of 4 to 70 weight %, particularly 5 to 50 weight % in case of the aqueous coating composition for high temperature baking.

On the other hand, the aqueous medium used in the aqueous coating composition of this invention derives from the above emulsions and is usually water, but may be a mixed solvent of water and a water-miscible organic solvent, according to circumstances.

Further, in the aqueous coating composition of this invention, the inorganic filler is compounded into the composition for the purpose of an extender, adjustment of the hardness of the coat, prevention of occurrence of blister, etc. As usable inorganic fillers, there can be exemplified substantially water-insoluble or water-sparingly soluble inorganic solid powders such as, for example, calcium carbonate, silica, alumina, kaolin, clay, talc, diatom earth, mica, aluminum hydroxide, glass powder, barium sulfate and magnesium carbonate.

The compounding quantity of these inorganic fillers can be varied over a wide range in accordance with their kind, physical properties desired for the coating composition, etc., but can be in the range of generally 100 to 390 weight parts, preferably 120 to 380 weight parts and more preferably 150 to 300 weight parts per 100 weight parts of the polymer fine particles [namely, the total of the synthetic rubber emulsion polymer particles (A) and the high Tg emulsion polymer particles (B), and the urethane emulsion polymer particles (C) which can be contained as occasion demands].

The inorganic filler desirably has an average particle size in the range of generally about 0.5 to about 50 microns, particularly about 1 to about 30 microns.

The coating composition of this invention can, if necessary, contain a rust-resistant pigment, a color pigment, a crosslinking agent, etc.

Examples of rust-resistant pigments are, red lead; chromic acid metal salts such as zinc chromate, barium chromate and strontium chromate; phosphoric acid metals salts such as zinc phosphate, calcium phosphate, aluminum phosphate, titanium phosphate and silicon phosphate, and orthophosphates and condensed phosphates of these metals; molybdic acid metal salts such as zinc molybdate, calcium molybdate, zinc calcium molybdate, zinc potassium molybdate, zinc potassium phosphomolybdate and calcium potassium phosphomolybdate; boric acid metal salts such as calcium borate, zinc borate, barium borate, barium metaborate and calcium metaborate; etc. Preferred among these rust-resistant pigments are nontoxic or low toxic rust-resistant pigments such as phosphoric acid metal salts, molybdic acid metal salts and boric acid melt salts.

The compounding quantity of the rust-resistant pigment can, for example, be in the range of 0 to 50 weight parts, preferably 5 to 30 weight parts per 100 weight parts of the polymer particles in the coating composition.

Further, as color pigments, there can be mentioned organic or inorganic color pigments such as, for example, titanium oxide, carbon black, red oxide, Hansa Yellow, Benzidine Yellow, Phthalocyanine Blue and Quinacridone Red. The compounding quantity of these color pigments can, for example, be in the range of 0 to 10 weight parts, preferably 0.5 to 5 weight parts per 100 weight parts of the fine polymer particles in the coating composition.

The particles sizes of these rust-resistant pigments and color pigments are preferably in the range of 1 to 50 microns, respectively, in view of the smoothness of the coat formed from the coating composition, etc.

Further, as appropriately compoundable crosslinking agents, there can be mentioned (a) water soluble polyvalent metal salts, for example, zinc salts such as zinc acetate, zinc formate, zinc sulfate and zinc chloride; aluminum salts such as aluminum acetate, aluminum nitrate and aluminum sulfate; calcium salts such as calcium acetate, calcium formate, calcium chloride, calcium nitrate and calcium nitrite; barium salts such as barium acetate, barium chloride and barium nitrite; magnesium salts such as magnesium acetate, magnesium formate, magnesium chloride, magnesium sulfate, magnesium nitrate and magnesium nitrite; lead salts such as lead acetate and lead formate; nickel salts such as nickel acetate, nickel chloride, nickel nitrate and nickel sulfate; manganese salts such as manganese acetate, manganese chloride, manganese sulfate and manganese nitrate; copper slats such as copper chloride, copper nitrate and copper sulfate; etc., (b) aziridine compounds such as, for example, reaction products of polyisocyanate compounds with ethyleneimine, (c) polyisocyanate compounds, for example, aromatic diisocyanate compounds such as m- or p-phenylene diisocyanate, 2,4- or 2,6-tolylene diisocyanate, m- or p-xylylene diisocyanate, and 4,4'-diphenylmethane diisocyanate; aliphatic or alicyclic diisocyanate compounds such as hexamethylene diisocyanate, isophorone diisocyanate, hydrogenated products of the above aromatic diisocyanate compounds and dimer acid diisocyanates; dimers or trimers of these isocyanates; adducts of these isocyanates to dihydric or trihydric polyols such as, for example, ethylene glycol and trimethylolpropane, (d) water soluble epoxy resins such as, for example, glycerol diglycidyl ether, (e) water soluble melamine resins such as, for example, methylolmelamine and methylolmelamine having etherified at least part of its hydroxyl groups with methyl alcohol, ethyl alcohol, n-butyl alcohol or the like, (f) water-dispersible blocked isocyanate such as, for example, trimethylolpropane tritolylene diisocyanate methyl ethyl ketoxime adduct and adducts of the above polyisocyanate compounds to volatile low molecular weight active hydrogen-containing compounds, etc.

As the above volatile low molecular weight active hydrogen-containing compounds, there can, for example, be mentioned aliphatic, alicyclic and aromatic alcohols such as methyl alcohol, ethyl alcohol, n-butyl alcohol, cyclohexyl alcohol, benzyl alcohol, ethylene glycol monoethyl ether, ethylene glycol monobutyl ether and phenol; hydroxy-tertiary amines such as demthylaminoethanol and diethylaminoethanol; ketoximes such as acetoxime and methyl ethyl ketoxime; active methylene compounds such as acetylacetone, acetoacetic esters and malonic esters; lactams such as ϵ-caprolactam; etc.

The use quantity of these crosslinking agents can, for example, be in the range of 0 to 10 weight parts, preferably 0.5 to 10 weight parts and particularly preferably 1 to 5 weight parts per 100 weight parts of the fine polymer particles in the coating composition obtained, in view of inhibition of change with time lapse of the viscosity of the composition, etc.

As occasion demands, there can be added to and mixed with the aqueous coating composition of this invention a dispersant such as an inorganic dispersant (e.g., sodium hexametaphosphate; sodium tripolyphosphate, etc.) or an organic dispersant [e.g., Nopcoperse 44C (trade name, polycarboxylic acid series, produced Sunnopco Co,, Ltd.)]; an antifoaming agent such as silicone one; a thickener or a viscosity improver such as polyvinyl alcohol, a cellulose derivative, a polycarboxylic acid resin or a surfactant type one; an organic solvent such as ethylene glycol, butyl cellosolve, butyl carbitol or butyl carbitol acetate; an age resister; an antiseptic agent, a fungicide; an ultraviolet absorber; an antistatic agent; etc.

The aqueous coating composition of this invention can, without no particular limitation, contain solid components in the range of generally about 40 to about 90 weight %, preferably about 50 to about 85 weight % and particularly preferably about 60 to about 80 weight %, have a pH in the range of 7 to 11, preferably 8 to 10, and have a viscosity (measured at 25° C. and 20 rpm using a B-type rotational viscometer) in the range of about 3,000 to about 100,000 cps, preferably about 5,000 to about 50,000 cps.

Base materials which can be coated with the aqueous coating composition of this invention are not particularly limited, and include, for example, steel sheets; various plated steel sheets such as lead-tin alloy-plated steel sheets (terne sheet steel sheets), tin-plated steel sheets, aluminum-plated steel sheets, lead-plated steel sheets, chromium-plate steel sheets and nickel-plated steel sheets; coated steel sheets such as electrodeposited steel sheets; etc.

The coating composition of this invention can suitably be used for coating of the electrodeposited surface, intercoated surface or overcoated surface or the like of workpieces obtained by molding and working such base materials into various shapes with a sheet metal press, etc; and various automobile members obtained by welding these workpieces, for example, the outdoor sheet metal working members of automobiles such as gasoline tanks, the back side of the flooring, tire houses, front aprons and rear aprons.

Coating with the coating composition of this invention can be carried out by a coating method known per se, for example, by brush coating, spray coating, roller coating or the like, but airless spray coating is preferred in general.

The thickness of the coat obtained is varied depending on the use of the base material, etc., but is, usually, in the range of about 200 to about 800 microns, particularly about 300 to about 600 microns. Further, although drying of the coat can be carried out by natural drying, drying with heating or the like but generally, in case of the aqueous coating composition for low temperature baking, it is preferred to bake it in a furnace of a temperature of about 60° to about 100° C., and in case of the aqueous coating composition for high temperature baking, it is preferred to preliminarily dry it at a temperature of about 60° to about 100° C. and then bake it in a furnace of a temperature of the order of about 120° to about 160° C.

This invention is further specifically described, below by examples.

Preparation of test samples used in examples and comparative examples and test methods using the samples are as follow:

(1) Preparation of specimens

Prescribed steel sheets of 0.8 (thickness)×100×200 mm are coated with samples respectively according to the airless spraying method so that the coats after drying become the prescribed thicknesses respectively, and the coats are heat treated under the prescribed conditions using a hot air circulation dryer.

(2) Blister threshold coat thickness

The spray coating in the above item (1) is repeated except for variously changing the thickness of the dried coat, and thereby maximum coat thickness causing no blister at the time of drying is determined. The maximum coat thickness is used as blister threshold coat thickness.

(3) Adhesion test

A specimen obtained by such coating in the item (1) that the thickness of the dried coat becomes about 300 μ is used. Cutting lines of such a depth as reaching the base material are made on the coat surface at intervals of 1 mm in the longitudinal and horizontal directions using a cross-cut adhesion tester (produced by Suga Shikenki Co., Ltd.) to prepare 100 checkerboard squares in 1 cm². Cellophane tape 24 mm wide (produced by NICHIBAN COMPANY, LIMITED) is stuck on the checkerboard square, 180° quick peeling is made by hand, and the number of the remaining squares of the coat is counted. Adhesion is expressed by the number of the squares remaining in the coat per 100.

(4) Ordinary state chipping resistance test

A specimen obtained by carrying out the coating step of the item (1) so that the thickness of dried coat is about 300 μ is allowed to stand 16 hours under a constant temperature condition of about 25° C. Cutting lines of an X having respective lengths of about 5 cm are made at such a depth as reaching the base material from the coat surface.

The resultant specimen is fixed leaning it at an angle of 60° against the horizontal surface, and nuts (M-6) are successively dropped in the perpendicular direction on the coated side, aiming at the cross part of the cutting lines, from a height of 2 m using a 25 mmφ polyvinyl chloride pipe. Ordinary state chipping resistance is evaluated by the total weight of nuts dropped up to the time when the material of the steel sheet is exposed.

(5) Wet chipping resistance test

A specimen obtained by carrying out the coating step of the item (1) so that the thickness of dried coat is about 300 μ is immersed in deionized water of about 40° C. for 7 days and water is wiped up. Then, the same cutting lines of an X as in the above item (4) were made. After allowing it to stand at 25° C. for 3 hours, the same chipping resistance test and the same evaluation as in the item (4) are carried out.

(6) Low temperature impact resistance test

A specimen prepared in the same manner as in the item (1) is left as it is under a constant temperature condition of −30° C. for 3 hours or more and a du Pont type impact resistance test is carried out according to JIS K-5400.

As for the conditions for this, an impact model and a pedestal each having a radium of 6.35±0.03 mm are attached to a tester, and the resultant specimen is put between them with the coated side being upward. A weight having a mass of 500±1 g is dropped on the impact model from a height of 50 cm, and the degree of the damage of the coated side is evaluated by visual observation according to the following evaluation criterion.

⊚. . . Change was not observed at all

◯ . . . A slight number of very small cracks were generated

△ . . . A large number of very small cracks were generated

X . . . Large cracks were generated

Reference Example 1

250 weight parts of deionized water was put in a 2000-ml separable flask equipped with a stirrer, a reflux condenser and a thermometer, and heated to 80° C. under nitrogen flow. Separately, 233 weight parts of deionized water and 10 weight parts of sodium dodecylbenzenesulfonate (ABS) were put in another vessel, and stirred to give a uniform aqueous solution. To this was dropwise added a mixed liquid of monomers obtained by uniformly mixing, 485 weight parts of styrene (St) and 15 weight parts of acrylic acid (AA), and the mixture was stirred to give a monomer preemulsion. This preemulsion and 30 weight parts of 5 weight % aqueous solution of ammonium persulfate (APS) as an aqueous solution of a polymerization initiator were continuously added to the deionized water in the separable flask. The mixture was held at the same temperature for 1 hour, and 4 ml of about 25 weight % ammonia water was added to obtain a styrene copolymer emulsion.

The monomer composition in this polymerization, the solid components, pH, viscosity, particle size of the obtained copolymer emulsion, and the Tg value of the copolymer particles are shown in Table 1.

Reference Examples 2 and 3

Almost the same procedures as in Reference example 1 were carried out except for changing the use quantity of ABS in Reference example 1 to obtain styrene copolymer emulsions having different particle sizes. The monomer compositions in these polymerizations, the solid components, pH values, viscosities, particle sizes of the obtained copolymer emulsions, and the Tg values of the copolymer particles are shown in Table 1.

Reference Examples 4 and 5

The procedure of Reference example 1 was repeated except that either 460 weight parts of St and 25 weight parts of 2-hydroxyethyl methacrylate (HEMA), or 435 weight parts of St and 50 weight parts of HEMA were used in place of 485 weight parts of St in Reference example 1, whereby a styrene copolymer emulsions were obtained. The monomer compositions in these polymerizations, the solid components, pH, viscosities, particle sizes of the obtained copolymer emulsions, and the Tg values of the copolymer particles are shown in Table 1.

Reference Examples 6 to 8

The procedure of Reference example 1 was repeated except that either 485 weight parts of methyl methacrylate (MMA); 325 weight parts of MMA and 160 weight parts of isobutyl methacrylate (iBMA); or 335 weight parts of MMA and 150 parts of acrylonitrile (AN) were used in place of 485 weight parts of St, whereby an acrylic copolymer emulsions were obtained. The monomer compositions in these polymerizations, the solid components, pH, viscosities, particle sizes of the obtained copolymer emulsions, and the Tg values of the copolymer particles are shown in Table 1.

Reference Example 9

The procedure of Reference example 1 was repeated except that 420 weight parts of St and 65 weight parts of 2-ethylhexyl acrylate (EHA) were used in place of 485 weight parts of St in Reference example 1, whereby a styrene acrylic copolymer emulsion was obtained. The monomer composition in this polymerization, the solid components, pH, viscosity, particle size of the obtained copolymer emulsion, and the Tg value of the copolymer particles are shown in Table 1.

Reference Examples 10 to 12

The procedure of Reference example 9 was repeated except that the use ratio of between St and EHA was changed in Reference example 9, whereby a styrene acrylic copolymer emulsions were obtained. The monomer compositions in these polymerizations, the solid components, pH, viscosities, particle sizes of the obtained copolymer emulsions, and the Tg values of the copolymer particles are shown in Table 1.

Reference Example 13

The procedure of Reference example 1 was repeated except that 185 weight parts of St and 300 weight parts of iBMA were used in place of 485 weight parts in Reference example 1, whereby an acrylic sterene copolymer emulsion was obtained. The monomer composition in this polymerization, the solid components, pH, viscosity, particle size of the obtained copolymer emulsion, and the Tg of the copolymer particles are shown in Table 1.

Reference Examples 14 and 15

Almost the same procedures as in Reference example 10 were carried out except that the use quantities of ABS were changed in Reference example 10, whereby styrene acrylic copolymer emulsions having different particle sizes. The monomer compositions in these polymerizations, the solid components, pH values, viscosities, particle sizes of the obtained copolymer emulsions, and the Tg values of the copolymer particles are shown in Table 1.

Reference Examples 16 and 17

The procedure of Reference example 10 was repeated except that either 340 weight parts of St, 120 weight parts of EHA and 25 weight parts of HEMA, or 320 weight parts of St, 115 weight parts of EHA and 50 weight parts of HEMA were used in place of 360 weight parts of St and 125 weight parts of EHA in Reference example 10, whereby a styrene-acrylic copolymer emulsions were obtained. The monomer compositions in these polymerizations, the solid components, pH, viscosities, particle sizes of the obtained copolymer emulsions, and the Tg values of the copolymer particles are shown in Table 1.

Reference Examples 18 and 19

The procedure of Reference example 10 was repeated except that either 370 weight parts of St and 115 weight parts of butyl acrylate (BA), or 335 weight parts of MMA and 150 weight parts of EHA were used in place of 360 weight parts of St and 125 weight parts of EHA in Reference example 10, whereby a styrene acrylic copolymer emulsion and an acrylic copolymer emulsion were obtained. The monomer compositions in these polymerizations, the solid components, pH, viscosities, particle sizes of the obtained copolymer emulsions, and the Tg values of the copolymer particles are shown in Table 1.

EXAMPLE 1

There were uniformly dispersed using a 133 weight parts (about 70 weight parts as solid components) of a commercially available SBR polymer emulsion SN-562 (produced by Sumitomo Dow Co , Ltd , Tg $-40°$ C. viscosity 170 cps, pH 7.1, solid components 52.5 weight %, particle size 0.16 $\mu$), 60 weight parts (about 30 weight parts as solid components) of the styrene copolymer emulsion of Reference example 1, 2.0 weight parts (about 0.88 weight parts as solid components) of Nopcoperse 44C (produced by Sunnopco Co., Ltd., polycarboxylic acid series) as a dispersant, 218 weight parts of powderly calcium carbonate (SL-700, average particle size 4.5 $\mu$, produced by Takehara Kagaku Kogyo Co., Ltd.) as an inorganic filler, 3 weight parts of carbon black and 12 weight parts of barium metaborate. Then, 0.5 weight parts of Adekanol UH-242 (produced by ASAHI DENKA KOGYO K.K.) as a thickener was added, and the mixture was further stirred to prepare a chipping-resistant aqueous coating composition having solid components of 78 weight % wherein the rate (hereinafter sometimes abbreviated as PWC) of the total pigments (the total quantity of powdery calcium carbonate, carbon black and barium metaborate) contained in the resulting coat was 70 weight %.

Various tests on physical properties were made using the obtained aqueous coating composition. The compounding composition of the composition and the results of measurement of various physical properties were shown in Table 2. As the base material of the specimen was used either a terne sheet steel sheet produced by NIPPON STEEL CORPORATION whose surface had been washed with thinner, or a steel sheet (ED sheet) which had been electrodeposited using a cationic electrodeposition coating U-600 produced by NIPPON PAINT CO., LTD., and the coat after application was subjected to high temperature baking treatment (baking at 120° C. for 20 minutes after preliminary drying at 80° C. for 15 minutes) using a hot air circulation dryer.

Examples 2 and 3 and Comparative Examples 1 and 2

The procedure of Example 1 was repeated except that, in Example 1, either the use ratio between the SBR polymer emulsion SN-562 and the styrene copolymer emulsion of Reference example 1 was changed, or only the SBR polymer emulsion SN-562 was used without using the styrene copolymer emulsion of Reference example 1, whereby chipping-resistant aqueous coating compositions having a PWC value of 70 weight % were prepared.

Various tests on physical properties were carried out using the resultant aqueous coating compositions. The compounding compositions of the compositions and the results of measurement of various physical properties were shown in Table 2. The same terne sheet steel sheet as used in Example 1 was used as the base material of the specimen, and the coats after coating were subjected to the same high temperature baking treatment as in Example 1.

Examples 4 and 5

Almost the same procedures as in Example 1 were carried out except that the use quantities of SL-700 were changed in Example 1, whereby chipping-resistant aqueous coating compositions having different PWC values were prepared.

Specimens were made in the same manner as in Example 2 using the obtained aqueous coating compositions, respectively, and various tests on physical properties were carried out using them. The compounding compositions of the compositions and the results of measurement of various physical properties were shown in Table 2.

Examples 6 to 14

Almost the same procedures as in Example 1 were carried out using, in place of the SBR polymer latex SN-562 in Example 1, a SBR polymer latex SN-534, J-1666 (these are produced by Sumitomo Dow Co., Ltd.), SK-80 (produced by Takeda Chemical Industries, Ltd.), L-2001, L-2337 (these are produced by Asahi Chemical Industry Co., Ltd.), polylac 707 (produced by MITSUI TOATSU CHEMICALS, INC.) or, LX-407C (produced by Nippon Zeon Co., Ltd.), or an NBR polymer latex Nipol 1571 or Nipol 1551 (these are produced by Nippon Zeon Co., Ltd.), whereby chipping-resistant aqueous coating compositions having a PWC value of 70 weight % were prepared.

Specimens were made in the same manner as in Example 2 using the obtained aqueous coating compositions, and various tests on physical properties were carried using them. The compounding compositions of the compositions and the results of measurement of various physical properties were shown in Table 2.

Examples 15 to 23

Almost the same procedures as in Example 1 were carried out except that, in Example 1, the copolymer emulsion of Reference example 2, 3, 4, 5, 6, 7, 8, 9 or 13 was used in place of the styrene copolymer emulsion of Reference example 1, whereby chipping-resistant aqueous coating compositions having a PWC value of 70 weight % were obtained.

Specimens were made in the same manner as in Example 2 using the obtained aqueous coating compositions, and various tests on physical properties were carried using them. The compounding compositions of the compositions and the results of measurement of various physical properties were shown in Table 2. As for examples 17 and 18, a terne sheet steel sheet or ED sheet was used as the base material of the specimen, as was the case with Example 1, and the same high baking treatments were carried out.

Examples 24 and 25

Almost the same procedures as in Example 1 were carried out except that, in Example 1, 4 weight parts (solid components: about 1 weight part) of SU-125F (produced by Meisei Kagaku Kogyo Co., Ltd., an aziridine compound) or 2 weight parts of zinc oxide further used as a crosslinking agent, whereby chipping-resistant aqueous coating compositions having a PWC value of 70 weight % were obtained.

Various tests on physical properties were carried out using the resultant aqueous coating compositions. The compounding compositions of the compositions and the results of measurement of various physical properties were shown in Table 3. The same ED sheet as used in Example 1 was used as the base material of the specimen, and the coats after coating were subjected to the same high temperature baking treatment as in Example 1.

Examples 26 and 27

Almost the same procedure as in Example 24 or Example 25 were carried out except that, in Example 24 or Example 25, the styrene copolymer emulsion of Reference example 5 was used in place of the styrene copolymer emulsion Reference example 1, whereby chipping-resistant aqueous coating compositions having a PWC value of 70 weight % were prepared.

Specimens were made in the same manner as in Example 24 using the obtained aqueous coating compositions, and various tests on physical properties were carried using them. The compounding compositions of the compositions and the results of measurement of various physical properties were shown in Table 3.

Example 28

Almost the same procedure as in Example 1 was carried out except that, in Example 1, 114 weight parts (about 60 weight parts as solid components) of a SBR polymer emulsion SN-562, 60 weight parts (about 30 weight parts as solid components) of the styrene copolymer emulsion of Reference example 1 and 33 weight parts (about 10 weight parts as solid components) of a commercially available urethane resin emulsion M-589 (produced by Toyo Polymer Co., Ltd.) were used in place of 133 weight parts (about 70 weight parts as solid components) of a SBR polymer emulsion SN-562 and 60 weight parts (about 30 weight parts as solid components) of the styrene copolymer emulsion of Reference example 1, whereby a chipping-resistant aqueous coating composition having a PWC of 70 weight % was prepared.

A specimen was made in the same manner as in Example 24 using the obtained aqueous coating composition, and various tests on physical properties were carried using it. The compounding composition of the composition and the results of measurement of various physical properties were shown in Table 3.

Examples 29 to 35 and Comparative Examples 3 and 4

Almost the same procedures as in Example 28 were carried out except that, in Example 28, either the use ratio of between the SBR polymer latex SN-562, the copolymer emulsion of Reference example 1 and the urethane resin emulsion M-589 was changed, or the copolymer emulsion of Reference example 1 or the copolymer emulsion of Reference example 1 and the urethane resin emulsion M-589 were not used, whereby chipping-resistant aqueous coating compositions having a PWC value of 70 weight % were prepared.

Specimens were made in the same manner as in Example 24 using the obtained aqueous coating compositions, and various tests on physical properties were carried using them. The compounding compositions of the compositions and the results of measurement of various physical properties were shown in Table 3.

Examples 36 and 37

Almost the same procedures as in Example 28 were carried out except that the use quantities of SL-700 were changed in Example 28, whereby chipping-resistant aqueous coating compositions having different PWC values were prepared.

Specimens were made in the same manner as in Example 24 using the obtained aqueous coating compositions, and various tests on physical properties were carried using them. The compounding compositions of the compositions and the results of measurement of various physical properties were shown in Table 3.

Examples 38 to 46

Almost the same procedures as in Example 28 were carried out except that, in Example 28, a SBR polymer latex SN-534, J-1666, SK-80, L-2001, L-2337, Polylac 707 or LX-407C, or an NBR polymer latex Nipol 1571 or Nipol 1551 was used in place of the SBR polymer latex SN-562, whereby a chipping-resistant aqueous coating compositions having a PWC value of 70 weight % were prepared.

Specimens were made in the same manner as in Example 24 using the obtained aqueous coating compositions, and various tests on physical properties were carried using them. The compounding compositions of the compositions and the results of measurement of various physical properties were shown in Table 3.

Examples 47 to 55

Almost the same procedures as in Example 28 were carried out except that, in Example 28, the copolymer emulsion of Reference example 2, 3, 4, 5, 6, 7, 8, 9 or 13 was used in place of the styrene copolymer emulsion of Reference example 1, whereby chipping-resistant aqueous coating compositions having a PWC value of 70 weight % were prepared.

Specimens were made in the same manner as in Example 24 using the obtained aqueous coating compositions, and various tests on physical properties were carried using them. The compounding compositions of the compositions and the results of measurement of various physical properties were shown in Table 3.

Example 56

Almost the same procedure as in Example 28 was carried out except that, in Example 28, an urethane resin emulsion M-437 (produced by Toyo Polymer Co., Ltd.) was used in place of the urethane resin emulsion M-589, whereby a chipping-resistant aqueous coating composition having a PWC of 70 weight % was prepared.

A specimen was made in the same manner as in Example 24 using the obtained aqueous coating composition, and various tests on physical properties were carried using it. The compounding composition of the composition and the results of measurement of various physical properties were shown in Table 3.

Examples 57 to 60

Almost the same procedures as in Example 28 or Example 50 were carried out except that, in Example 28 or Example 50, 4 weight parts (about 1 weight % as solid components) of SU-125F or 2 weight parts of Zinc oxide was further used as a crosslinking agent, whereby chipping-resistant aqueous coating compositions having a PWC value of 70 weight % were prepared.

Specimens were made in the same manner as in Example 24 using the obtained aqueous coating compositions, and various tests on physical properties were carried using them. The compounding compositions of the compositions and the results of measurement of various physical properties were shown in Table 3.

Example 61

Almost the same procedure as in Example 1 was carried out except that, in Example 1, the styrene acrylic copolymer emulsion of Reference example 10 was used in place of the styrene copolymer emulsion of Reference example 1, whereby there was obtained a chipping-resistant aqueous coating composition having a PWC of 70 weight % and solid components of 78.0 weight %.

Various tests on physical properties were carried out using the resultant aqueous coating composition. The compounding composition of the composition and the results of measurement of various physical properties were shown in Table 4. The same terne sheet steel sheet or ED Sheet as used in Example 1 was used as the base material of the specimen, and the coat after coating was subjected to low temperature baking treatment (baking at 80° C. for 30 minutes) using a hot air circulation dryer.

Examples 62 and 63 and Comparative Examples 5 and 6

The procedure of Example 61 was repeated except that, in Example 61, either the use ratios between the SBR polymer emulsion SN-562 and the styrene acrylic copolymer emulsion were changed, or only the SBR polymer emulsion SN-562 was used without using the styrene acrylic copolymer emulsion of Reference example 10, whereby chipping-resistant aqueous coating compositions having a PWC value of 70 weight % were obtained.

Various tests on physical properties were carried out using the resultant aqueous coating compositions. The compounding compositions of the compositions and the results of measurement of various physical properties were shown in Table 4. The same terne sheet steel sheet as used in Example 1 was used as the base material of the specimen, and the coats after coating were subjected to low temperature baking treatment as in Example 61.

Examples 64 and 65

Almost the same procedures as in Example 61 were carried out except that the use quantities of SL-700 were changed in example 61, whereby chipping-resistant aqueous coating compositions having different PWC values were prepared.

Specimens were made in the same manner as in Example 62 using the obtained aqueous coating compositions, and various tests on physical properties were carried using them. The compounding compositions of the compositions and the results of measurement of various physical properties were shown in Table 4.

Examples 66 to 74

Almost the same procedures as in Example 61 were carried out except that, in Example 61, a SBR polymer latex SN-534, J-1666, SK-80, L-2001, L-2337, Polylac 707 or LX-407C, or an NBR polymer latex Nipol 1571 or Nipol 1551 was used in place of the SBR polymer latex SN-562, whereby chipping-resistant aqueous coating compositions having a PWC value of 70 weight % were prepared.

Specimens were made in the same manner as in Example 62 using the obtained aqueous coating compositions, and various tests on physical properties were carried using them. The compounding compositions of the compositions and the results of measurement of various physical properties were shown in Table 4.

Examples 75 to 81 and Comparative Example 7

Almost the same procedures as in Example 61 were carried out except that, in Example 61, the copolymer emulsion of Reference example 11, 12, 13, 14, 15, 16, 17, 18 or 19 was used in place of the styrene acrylic copolymer emulsion of Reference example 10, whereby chipping-resistant aqueous coating compositions having a PWC value of 70 weight % were prepared.

Specimens were made in the same manner as in Example 62 using the obtained aqueous coating compositions, and various tests on physical properties were carried using them. The compounding compositions of the compositions and the results of measurement of various physical properties were shown in Table 4. As for Examples 78 and 79, a terne sheet steel sheet or an ED sheet was used as the base material of the specimen, as was the case in Example 61, and the same low temperature baking treatment baking as therein was carried out.

Examples 82 and 83

Almost the same procedure as in Example 57 or Example 58 was carried out except that, in Example 57 or Example 58, the styrene acrylic copolymer emulsion of Reference example 17 was used in place of the styrene copolymer emulsion of Reference example 1, whereby chipping-resistant aqueous coating compositions having a PWC value of 70 weight % were prepared.

Various tests on physical properties were carried out using the resultant aqueous coating compositions. The compounding compositions of the compositions and the results of measurement of various physical properties were shown in Table 5. The same ED sheet as used in Example 1 was used as the base material of the specimen, and the coat after coating was subjected to the same low temperature baking treatment as in Example 61.

Example 84

Almost the same procedure as in Example 61 was carried out except, in Example 61, 95 weight parts (about 50 weight parts as solid components) of a SBR polymer emulsion SN-562, 40 weight parts (about 20 weight parts as solid components) of the styrene acrylic copolymer emulsion of Reference example 10 and 100 weight parts (about 30 weight parts as solid components) of a commercially available urethane resin emulsion M-589 were used in place of 133 weight parts (about 70 weight parts as solid components) of a SBR polymer emulsion SN-562 and 60 weight parts (about 30 weight parts as solid components) of the styrene acrylic copolymer emulsion of Reference example 10, whereby a chipping-resistant aqueous coating composition having a PWC value of 70 weight % was prepared.

A specimen was made in the same manner as in Example 82 using the obtained aqueous coating compositions, and various tests on physical properties were carried using it. The compounding composition of the composition and the results of measurement of various physical properties were shown in Table 5.

Examples 85 to 88 and Comparative Examples 8 and 9

Almost the same procedures as in Example 84 were carried out except that, in Example 84, either the use ratios of between the SBR polymer latex SN-562, the styrene acrylic copolymer emulsion of Reference example 10 and the urethane resin emulsion M-589 were changed, or the copolymer emulsion of Reference example 10 or the copolymer emulsion of Reference example 10 and the urethane resin emulsion M-589 were not used, whereby chipping-resistant aqueous coating compositions having a PWC value of 70 weight % were prepared.

Specimens were made in the same manner as in Example 82 using the obtained aqueous coating compositions, and various tests on physical properties were carried using them. The compounding compositions of the compositions and the results of measurement of various physical properties were shown in Table 5.

Examples 87 and 88

Almost the same procedures as in Example 84 were carried out except that the use amounts of SL-700 were changed in Example 84, whereby chipping-resistant aqueous coating compositions having different PWC values were obtained.

Specimens were made in the same manner as in Example 28 using the obtained aqueous coating compositions, and various tests on physical properties were carried using them. The compounding compositions of the compositions and the results of measurement of various physical properties were shown in Table 5.

Examples 89 to 97

Almost the same procedures as in Example 84 were carried out except that, in Example 84, a SBR polymer latex SN-534, J-1666, SK-80, L-2001, L-2337, Polylac 707 or LX-407C, or an NBR polymer latex Nipol 1571 or Nipol 1551 was used in place of the SBR polymer latex SN-562, whereby chipping-resistant aqueous coating compositions having a PWC value of 70 weight % were prepared.

A specimen was made in the same manner as in Example 82 using the obtained aqueous coating compositions, and various tests on physical properties were carried using it. The compounding composition of the composition and the results of measurement of various physical properties were shown in Table 5.

Examples 98 to 104

Almost the same procedures as in Example 84 were carried out except that, in Example 84, the copolymer emulsion of Reference example 11, 12, 14, 15, 16, 17, 18 or 19 was used in place of the styrene acrylic copolymer emulsion of Reference example 10, whereby chipping-resistant aqueous coating compositions having a PWC value of 70 weight % were prepared.

Specimens were made in the same manner as in Example 82 using the obtained aqueous coating compositions, and various tests on physical properties were carried using them. The compounding compositions of the compositions and the results of measurement of various physical properties were shown in Table 5.

Examples 105

Almost the same procedure as in Example 84 was carried out except that, in Example 84, an urethane resin emulsion M-437 was used in place of the urethane resin emulsion M-589, whereby a chipping-resistant aqueous coating composition having a PWC value of 70 weight % was prepared.

A specimen was made in the same manner as in Example 82 using the obtained aqueous coating composition, and various tests on physical properties were carried using it. The compounding composition of the composition and the results of measurement of various physical properties were shown in Table 5.

Example 106 to 109

Almost the same procedure as in Example 84 or Example 102 was carried out except, in Example 84 or Example 102, 4 weight parts (about 1 weight part as solid components) of SU-125F or 2 weight parts of zinc oxide was further used as a crosslinking agent, whereby chipping-resistant aqueous coating compositions having a PWC value of 70 weight % were prepared.

Specimens were made in the same manner as in Example 82 using the obtained aqueous coating compositions, and various tests on physical properties were carried using them. The compounding compositions of the compositions and the results of measurement of various physical properties were shown in Table 5.

Further, various characteristics of the synthetic rubber latexes and urethane resin emulsions used in the examples and comparative examples were shown in Table 6 and Table 7.

TABLE 1

High Tg polymer emulsion (B)

| Experiment No. | Monomer composition | | | | | | | | High Tg polymer emulsion characteristic values | | | | Polymer particle Tg (°C.) |
|---|---|---|---|---|---|---|---|---|---|---|---|---|---|
| | (b-1) | | | | (b-2) | (b-3) | (b-4) | | Solid component (weight %) | PH | Viscosity (cps) | Particle size (μ) | |
| | St | MMA | iBMA | AN | AA | HEMA | EHA | BA | | | | | |
| R. example 1 | 97 | — | — | — | 3 | — | — | — | 50 | 7.5 | 120 | 0.2 | 93 |
| R. example 2 | " | — | — | — | " | — | — | — | " | " | 320 | 0.1 | " |
| R. example 3 | " | — | — | — | " | — | — | — | " | " | 80 | 0.3 | " |
| R. example 4 | 92 | — | — | — | " | 5 | — | — | " | " | 430 | 0.2 | 91 |
| R. example 5 | 87 | — | — | — | " | 10 | — | — | " | " | 650 | " | 90 |
| R. example 6 | — | 97 | — | — | " | — | — | — | " | " | 120 | " | 105 |
| R. example 7 | — | 65 | 32 | — | " | — | — | — | " | " | 150 | " | 90 |
| R. example 8 | — | 67 | — | 30 | " | — | — | — | " | " | 180 | " | 105 |
| R. example 9 | 84 | — | — | — | " | — | 13 | — | " | " | 170 | " | 70 |
| R. example 10 | 72 | — | — | — | " | — | 25 | — | " | " | 210 | " | 50 |
| R. example 11 | 60 | — | — | — | " | — | 37 | — | " | " | 250 | " | 30 |
| R. example 12 | 48 | — | — | — | " | — | 49 | — | " | " | 200 | " | 10 |
| R. example 13 | 37 | — | 60 | — | " | — | — | — | " | " | 130 | " | 70 |
| R. example 14 | 72 | — | — | — | " | — | 25 | — | " | " | 350 | 0.1 | 50 |
| R. example 15 | " | — | — | — | " | — | — | — | " | " | 120 | 0.3 | " |
| R. example 16 | 68 | — | — | — | " | 5 | 24 | — | " | " | 680 | 0.2 | " |
| R. example 17 | 64 | — | — | — | " | 10 | 23 | — | " | " | 960 | " | " |
| R. example 18 | 74 | — | — | — | " | — | — | 23 | " | " | 180 | " | " |
| R. example 19 | — | 67 | — | — | " | — | 30 | — | " | " | 230 | " | " |

R. example: Reference example

TABLE 2

(1) Compounding in chipping-resistant aqueous coating compositions (1)

| Experiment No. | Synthetic rubber polymer emulsion (A) | | High Tg polymer emulsion (B) | | Inorganic filler Calcium carbonate | | Color pigment Carbon black (weight part) | Rust-resistant pigment Barium metaborate (weight part) |
|---|---|---|---|---|---|---|---|---|
| | Kind | Use quantity (weight part)*1 | Kind | Use quantity (weight part)*1 | Kind | Use quantity (weight part) | | |
| Example 1 | SN-562 | 133 (70) | R. ex 1 | 60 (30) | SL-700 | 218 | 3 | 12 |
| C. example 1 | " | 190 (100) | — | — | " | " | " | " |
| Example 2 | " | 171 (90) | R. ex 1 | 20 (10) | " | " | " | " |
| Example 3 | " | 114 (60) | " | 80 (40) | " | " | " | " |
| C. example 2 | " | 76 (40) | " | 120 (60) | " | " | " | " |
| Example 4 | " | 133 (70) | " | 60 (30) | " | 135 | " | " |
| Example 5 | " | " | " | " | " | 385 | " | " |
| Example 6 | SN-534 | 137 (70) | " | " | " | 218 | " | " |
| Example 7 | J-1666 | 137 " | " | " | " | " | " | " |
| Example 8 | SK-80 | 134 " | " | " | " | " | " | " |
| Example 9 | L-2001 | 143 " | " | " | " | " | " | " |
| Example 10 | L-2337 | 140 " | " | " | " | " | " | " |
| Example 11 | Polylac | 146 " | " | " | " | " | " | " |
| Example 12 | LX-407C | 140 " | " | " | " | " | " | " |
| Example 13 | 1571 | 175 " | " | " | " | " | " | " |
| Example 14 | 1551 | 137 " | " | " | " | " | " | " |
| Example 15 | SN-562 | 133 (70) | R. ex 2 | " | " | " | " | " |
| Example 16 | " | " | R. ex 3 | " | " | " | " | " |
| Example 17 | " | " | R. ex 4 | " | " | " | " | " |
| Example 18 | " | " | R. ex 5 | " | " | " | " | " |
| Example 19 | " | " | R. ex 6 | " | " | " | " | " |
| Example 20 | " | " | R. ex 7 | " | " | " | " | " |
| Example 21 | " | " | R. ex 8 | " | " | " | " | " |

TABLE 2-continued

| | | | | | | | | |
|---|---|---|---|---|---|---|---|---|
| Example 22 | " | " | R. ex 9 | " | " | " | " | " |
| Example 23 | " | " | R. ex 13 | " | " | " | " | " |

(2) Physical properties of the chipping-resistant aqueous coating composition (1)

| | Characteristics of the coating composition | | | | Coat formation condition | | Physical properties of the coat of the coating composition | | | | |
|---|---|---|---|---|---|---|---|---|---|---|---|
| Experiment No. | Solid component (weight %) | pH | Viscosity (cps) | PWC (weight %) | Base material | Baking condition | Blister threshold (μ) | Adhesion to the base material | Chipping resistance ordinary state (kg) | Chipping resistance wet (kg) | Low temperature impact resistance |
| Example 1 | 78.0 | 9.1 | 25000 | 70 | terne sheet | high temperature | 800 | 100/100 | 50 | 20 | ◉ |
| | | | | | ED | high temperature | " | 80/100 | 25 | 15 | ○ |
| C. example 1 | 78.3 | 9.0 | " | " | terne sheet | high temperature | 500 | 10/100 | 15 | 5 | X |
| Example 2 | 78.1 | 9.2 | 23000 | " | " | high temperature | 600 | 80/100 | 40 | 15 | ○ |
| Example 3 | 77.6 | 9.1 | 24000 | " | " | high temperature | 900 | 100/100 | 60 | 25 | ◉ |
| C. example 2 | 77.2 | " | 25000 | " | " | high temperature | coat crack | — | — | — | — |
| Example 4 | 72.4 | 9.0 | 20000 | 60 | " | high temperature | 600 | 80/100 | 40 | 15 | ◉ |
| Example 5 | 84.0 | 9.2 | 29000 | 80 | " | high temperature | 1000 | 100/100 | 60 | 30 | ○ |
| Example 6 | 77.3 | 9.1 | 23000 | 70 | " | high temperature | 800 | " | 40 | 20 | ◉ |
| Example 7 | " | " | 25000 | " | " | high temperature | 800 | " | " | " | " |
| Example 8 | 77.8 | 9.0 | 24000 | " | " | high temperature | 700 | " | 30 | 15 | " |
| Example 9 | 76.2 | 9.2 | 23000 | " | " | high temperature | 1000 | " | 40 | 20 | " |
| Example 10 | 76.7 | 9.1 | 25000 | " | " | high temperature | 900 | " | 50 | " | " |
| Example 11 | 75.7 | " | 26000 | " | " | high temperature | 700 | " | " | " | ○ |
| Example 12 | 76.7 | 9.0 | 23000 | " | " | high temperature | 900 | " | 60 | 25 | " |
| Example 13 | 71.0 | 9.2 | 21000 | " | " | high temperature | 800 | " | 40 | 20 | ◉ |
| Example 14 | 77.3 | 9.1 | 24000 | " | " | high temperature | 800 | " | 35 | 15 | " |
| Example 15 | 78.0 | 9.2 | 25000 | " | " | high temperature | 900 | " | 60 | 25 | " |
| Example 16 | " | 9.1 | 26000 | " | " | high temperature | 700 | " | 40 | 15 | " |
| Example 17 | " | 9.0 | 24000 | " | " | high temperature | 800 | " | 60 | 25 | " |
| | | | | | ED | high temperature | " | 90/100 | 30 | 15 | ○ |
| Example 18 | " | 9.2 | 26000 | " | terne sheet | high temperature | 700 | 100/100 | 70 | 30 | ◉ |
| | | | | | ED | high temperature | " | " | 35 | 20 | " |
| Example 19 | " | " | 25000 | " | terne sheet | high temperature | 1000 | " | 50 | 20 | " |
| Example 20 | " | 9.1 | 24000 | " | " | high temperature | 900 | " | 45 | " | " |
| Example 21 | " | 9.0 | 23000 | " | " | high temperature | 1000 | " | 55 | 25 | " |
| Example 22 | " | 9.1 | 24000 | " | " | high temperature | 600 | " | 50 | " | " |
| Example 23 | " | 9.2 | 27000 | " | " | high temperature | 700 | " | 40 | 15 | " |

*1 ... Figures in paraentheses represent weight % based on the total of the emulation polymer particles (A) and the high Tg emulsion polymer particels (B)
C. example: Comparative example
R. ex: Reference example

TABLE 3

(1) Compounding in chipping-resistant aqueous coating compositions (2)

| | Synthetic rubber polymer emulsion (A) | High Tg polymer emulsion (B) | Urethane resin emulsion (C) |
|---|---|---|---|
| Experi- | Use quantity (weight | Use quantity (weight | Use quantity (weight |

TABLE 3-continued

| ment No. | Kind | part)*1 | Kind | part)*1 | Kind | part)*1 |
|---|---|---|---|---|---|---|
| Example 24 | SN-562 | 133 (70) | R. ex 1 | 60 (30) | — | — |
| Example 25 | " | " | " | " | — | — |
| Example 26 | " | " | R. ex 5 | " | — | — |
| Example 27 | " | " | " | " | — | — |
| Example 28 | " | 114 (66.7) | R. ex 1 | 60 (33.3) | M-589 | 33 (11.1) |
| C. example 3 | " | 190 (100) | — | — | — | — |
| Example 29 | " | 171 (94.7) | R. ex 1 | 10 (5.3) | M-589 | 17 (5.3) |
| C. example 4 | " | 133 (100) | — | — | " | 100 (30) |
| Example 30 | " | 133 (93.3) | R. ex 1 | 10 (6.7) | " | 83 (33.3) |
| Example 31 | " | 133 (77.8) | " | 40 (22.2) | " | 33 (11.1) |
| Example 32 | " | 133 (73.7) | " | 50 (26.3) | " | 17 (5.3) |
| Example 33 | " | 95 (71.4) | " | 40 (28.6) | M-589 | 100 (42.9) |
| Example 34 | " | 95 (62.5) | " | 60 (37.5) | " | 67 (25.0) |
| Example 35 | " | 95 (55.6) | " | 80 (44.4) | " | 33 (11.1) |
| Example 36 | " | 114 (66.7) | " | 60 (33.3) | " | " |
| Example 37 | " | " | " | " | " | " |
| Example 38 | SN-534 | 118 (66.7) | " | " | " | " |
| Example 39 | J-1666 | 118 (66.7) | " | " | " | " |
| Example 40 | SK-80 | 115 (66.7) | " | " | " | " |
| Example 41 | L-2001 | 122 (66.7) | " | " | " | " |
| Example 42 | L-2337 | 120 (66.7) | " | " | " | " |
| Example 43 | Polylac | 125 (66.7) | " | " | " | " |
| Example 44 | LX-407C | 120 (66.7) | " | " | " | " |
| Example 45 | 1571 | 150 (66.7) | " | " | " | " |
| Example 46 | 1551 | 118 (66.7) | " | " | " | " |
| Example 47 | SN-562 | 114 (66.7) | R. ex 2 | 60 (33.3) | M-589 | 33 (11.1) |
| Example 48 | " | " | R. ex 3 | " | " | " |
| Uxample 49 | " | " | R. ex 4 | " | " | " |
| Example 50 | " | " | R. ex 5 | " | " | " |
| Example 51 | " | " | R. ex 6 | " | " | " |
| Example 52 | " | " | R. ex 7 | " | " | " |
| Example 53 | " | " | R. ex 8 | " | " | " |
| Example 54 | " | " | R. ex 9 | " | " | " |
| Example 55 | " | " | R. ex 13 | " | " | " |
| Example 56 | " | " | R. ex 1 | " | M-437 | 22 (11.1) |
| Example 57 | " | " | " | " | M-589 | 33 (11.1) |
| Example 58 | " | " | " | " | " | " |
| Example 59 | " | " | R. ex 5 | " | " | " |
| Example 60 | " | " | " | " | " | " |

(1) Compounding in chipping-resistant aqueous coating compositions (2)

| | Item | | | | | |
|---|---|---|---|---|---|---|
| | Inorganic filler | | Color | Rust-resist- | Crosslinking agent | |
| | Calcium carbonate | | pigment | ant pigment | | Use quantity |
| Experi- | | Use quanti- | Carbon black | Barium meta- | | (solid compo- |
| ment No. | Kind | ty (weight part) | (weight part) | borate (weight part) | Kind | nent) (weight part) |
| Example 24 | SL-700 | 218 | 3 | 12 | SU-125F | 4 (1) |
| Example 25 | " | " | " | " | ZnO | 2 (2) |
| Example 26 | " | " | " | " | SU-125F | 4 (1) |
| Example 27 | " | " | " | " | Zno | 2 (2) |
| Example 28 | " | " | " | " | — | — |
| C. example 3 | " | " | " | " | — | — |
| Example 29 | " | " | " | " | — | — |
| C.example 4 | " | " | " | " | — | — |
| Example 30 | " | " | " | " | — | — |
| Example 31 | " | " | " | " | — | — |
| Example 32 | " | " | " | " | — | — |
| Example 33 | " | " | " | " | — | — |
| Example 34 | " | " | " | " | — | — |
| Example 35 | " | " | " | " | — | — |
| Example 36 | " | 135 | " | " | — | — |
| Example 37 | " | 385 | " | " | — | — |
| Example 38 | " | 218 | " | " | — | — |
| Example 39 | " | " | " | " | — | — |
| Example 40 | " | " | " | " | — | — |
| Example 41 | " | " | " | " | — | — |
| Example 42 | " | " | " | " | — | — |
| Example 43 | " | " | " | " | — | — |
| Example 44 | " | " | " | " | — | — |
| Example 45 | " | " | " | " | — | — |
| Example 46 | " | " | " | " | — | — |
| Example 47 | SL-700 | 218 | 3 | 12 | — | — |
| Example 48 | " | " | " | " | — | — |
| Example 49 | " | " | " | " | — | — |
| Example 50 | " | " | " | " | — | — |
| Example 51 | " | " | " | " | — | — |
| Example 52 | " | " | " | " | — | — |
| Example 53 | " | " | " | " | — | — |

TABLE 3-continued

| | | | | | | |
|---|---|---|---|---|---|---|
| Example 54 | " | " | " | " | — | — |
| Example 55 | " | " | " | " | — | — |
| Example 56 | " | " | " | " | — | — |
| Example 57 | " | " | " | " | SU-125F | 4 (1) |
| Example 58 | " | " | " | " | ZnO | 2 (2) |
| Example 59 | " | " | " | " | SU-125F | 4 (1) |
| Example 60 | " | " | " | " | ZnO | 2 (2) |

(2) Physical properties of the chipping-resistant aqueous coating composition (2)

| | Characteristics of the coating composition | | | | Coat formation condition | | Physical properties of the coat of the coating composition | | Chipping resistance | | Low temperature impact resistance |
|---|---|---|---|---|---|---|---|---|---|---|---|
| Experiment No. | Solid component (weight %) | pH | Viscosity (cps) | PWC (weight %) | Base material | Baking condition | Blister threshold ($\mu$) | Adhesion to the base material | ordinary state (kg) | wet (kg) | |
| Example 24 | 77.5 | 9.2 | 24000 | 70 | E D | high temperature | 1000 | 100/100 | 40 | 25 | ◉ |
| Example 25 | 78.1 | 9.1 | 25000 | " | " | high temperature | 800 | " | 35 | 20 | ○ |
| Example 26 | 77.5 | " | 27000 | " | " | high temperature | 900 | " | 50 | 30 | ◉ |
| Example 27 | 78.1 | 9.2 | 24000 | " | " | high temperature | 700 | " | 40 | 25 | ○ |
| Example 28 | 75.3 | 9.1 | 25000 | " | " | high temperature | 1000 | " | 50 | 20 | ◉ |
| C. example 3 | 78.3 | 9.2 | " | " | " | high temperature | 600 | 10/100 | 10 | 5 | " |
| Example 29 | 76.8 | 9.1 | " | " | " | high temperature | " | 100/100 | 30 | 15 | " |
| C. example 4 | 71.1 | 9.3 | 21000 | " | " | high temperature | 400 | 50/100 | 20 | 10 | " |
| Example 30 | 72.2 | 9.2 | 27000 | " | " | high temperature | 600 | 100/100 | 40 | 15 | " |
| Example 31 | 75.5 | 9.1 | 22000 | " | " | high temperature | 800 | " | 50 | 20 | " |
| Example 32 | 76.5 | " | 24000 | " | " | high temperature | 900 | " | 30 | 15 | " |
| Example 33 | 70.8 | " | 22000 | " | " | high temperature | 700 | " | 80 | 30 | " |
| Example 34 | 72.8 | " | 23000 | " | " | high temperature | 900 | " | 70 | 20 | " |
| Example 35 | 75.1 | 9.2 | 25000 | " | " | high temperature | 1100 | " | 60 | 30 | " |
| Example 36 | 69.6 | 9.1 | 18000 | 60 | " | high temperature | 700 | " | " | 20 | " |
| Example 37 | 82.0 | 9.2 | 32000 | " | " | high temperature | 1200 | " | 40 | 30 | ○ |
| Example 38 | 74.6 | 9.1 | 22000 | 80 | " | high temperature | 1000 | " | 50 | 20 | " |
| Example 39 | 74.6 | 9.0 | 25000 | " | " | high temperature | 800 | " | 40 | " | ◉ |
| Example 40 | 75.1 | 9.1 | " | " | " | high temperature | 700 | " | 30 | 15 | " |
| Example 41 | 74.0 | 9.3 | 21000 | " | " | high temperature | 1000 | " | 50 | 20 | " |
| Example 42 | 74.3 | 9.2 | 23000 | " | " | high temperature | 900 | " | " | " | " |
| Example 43 | 73.5 | 9.1 | 25000 | " | " | high temperature | " | " | 60 | 30 | ○ |
| Example 44 | 74.3 | 9.0 | 21000 | " | " | high temperature | 1000 | " | 70 | " | " |
| Example 45 | 69.6 | 9.1 | 20000 | " | " | high temperature | 900 | " | 40 | 20 | ◉ |
| Example 46 | 74.6 | 9.2 | 21000 | " | " | high temperature | 800 | " | 30 | 15 | " |
| Example 47 | 75.3 | 9.1 | 25000 | 70 | E D | high temperature | 1100 | 100/100 | 60 | 30 | ◉ |
| Example 48 | " | 9.2 | 22000 | " | " | high temperature | 900 | " | 40 | 20 | ○ |
| Example 49 | " | 9.0 | " | " | " | high temperature | 1000 | " | 60 | " | ◉ |
| Example 50 | " | " | 23000 | " | " | high temperature | 900 | " | 70 | 25 | " |
| Example 51 | " | 9.2 | 25000 | " | " | high temperature | " | " | 60 | 20 | " |
| Example 52 | " | 9.1 | 24000 | " | " | high temperature | " | " | 50 | " | " |
| Example 53 | " | 9.2 | 26000 | " | " | high temperature | 1000 | " | 45 | 25 | " |

TABLE 3-continued

| | | | | | | | | | | | |
|---|---|---|---|---|---|---|---|---|---|---|---|
| Example 54 | " | 9.0 | 25000 | " | " | high temperature | 700 | " | 40 | 20 | " |
| Example 55 | " | 9.1 | 23000 | " | " | high temperature | " | " | 50 | " | " |
| Example 56 | 77.2 | " | " | " | " | high temperature | 900 | " | 40 | " | " |
| Example 57 | 74.8 | 9.0 | 25000 | " | " | high temperature | 1000 | " | 60 | 40 | " |
| Example 58 | 75.4 | 9.1 | 23000 | " | " | high temperature | " | " | " | 35 | ○ |
| Example 59 | 74.8 | " | 25000 | " | " | high temperature | 900 | " | 80 | 50 | ◎ |
| Example 60 | 75.4 | 9.0 | 21000 | " | " | high temperature | " | " | " | 40 | ○ |

*1 ... Figures in parentheses represent weight % based on the total of the emulation polymer particles (A) and the high Tg emulsion polymer particels (B)
C. example: Comparative example
R. ex: Reference example

TABLE 4

Compounding in chipping-resistant aqueous coating compositions (3)

| Experiment No. | Synthetic rubber polymer emulsion (A) | | High Tg polymer emulsion (B) | | Inorganic filler Calcium carbonate | | Color pigment Carbon black (weight part) | Rust-resistant pigment Barium metaborate weight part) |
|---|---|---|---|---|---|---|---|---|
| | Kind | Use quantity (weight part)*1 | Kind | Use quantity (weight part)*1 | Kind | Use quantity (weight part) | | |
| Example 61 | SN-562 | 133 (70) | R. ex 10 | 60 (30) | SL-700 | 218 | 3 | 12 |
| C. example 5 | " | 190 (100) | — | — | " | " | " | " |
| Example 62 | " | 171 (90) | R. ex 10 | 20 (10) | " | " | " | " |
| Example 63 | " | 114 (60) | " | 80 (40) | " | " | " | " |
| C. example 6 | " | 76 (40) | " | 120 (60) | " | " | " | " |
| Example 64 | " | 133 (70) | " | 60 (30) | " | 135 | " | " |
| Example 65 | " | " | " | " | " | 385 | " | " |
| Example 66 | SN-534 | 137 (70) | " | " | " | " | " | " |
| Example 67 | J-1666 | 137 (70) | " | " | " | " | " | " |
| Example 68 | SK-80 | 134 (70) | " | " | " | " | " | " |
| Example 69 | L-2001 | 143 (70) | " | " | " | " | " | " |
| Example 70 | L-2337 | 140 (70) | " | " | " | " | " | " |
| Example 71 | Polylac | 146 (70) | " | " | " | " | " | " |
| Example 72 | LX-407C | 140 (70) | " | " | " | " | " | " |
| Example 73 | 1571 | 175 (70) | " | " | " | " | " | " |
| Example 74 | 1551 | 137 (70) | " | " | " | " | " | " |
| Example 75 | SN-562 | 133 (70) | R. ex 11 | " | " | " | " | " |
| C. example 7 | " | " | R. ex 12 | " | " | " | " | " |
| Example 76 | " | " | R. ex 14 | " | " | " | " | " |
| Example 77 | " | " | R. ex 15 | " | " | " | " | " |
| Example 78 | " | " | R. ex 16 | " | " | " | " | " |
| Example 79 | " | " | R. ex 17 | " | " | " | " | " |
| Example 80 | " | " | R. ex 18 | " | " | " | " | " |
| Example 81 | " | " | R. ex 19 | " | " | " | " | " |

Physical properties of the chipping-resistant aqueous coating composition (3)

| Experiment No. | Characteristics of the coating composition | | | | Coat formation condition | | Physical properties of the coat of the coating composition | | | Low temperature impact resistance |
|---|---|---|---|---|---|---|---|---|---|---|
| | Solid component (weight %) | pH | Viscosity (cps) | PWC (weight %) | Base material | Baking condition | resistance Adhesion to the base material | Chipping ordinary state (kg) | perature wet (kg) | |
| Example 61 | 78.0 | 9.0 | 25000 | 70 | terne sheet E D | low temperature " | 100/100 80/100 | 40 25 | 20 15 | ◎ ○ |
| C. example 5 | " | 9.2 | 26000 | " | terne sheet | " | 10/100 | 15 | 5 | X |
| Example 62 | " | 9.1 | 24000 | " | " | " | 80/100 | 30 | 15 | ○ |
| Example 63 | " | " | 25000 | " | " | " | 100/100 | 50 | 20 | ◎ |
| C. example 6 | " | 9.0 | 23000 | " | " | " | coat crack | — | — | — |
| Example 64 | 72.4 | " | 21000 | 60 | " | " | 80/100 | 30 | 15 | ○ |
| Example 65 | 84.0 | 9.2 | 29000 | 80 | " | " | 100/100 | 50 | 25 | " |
| Example 66 | 77.3 | 9.0 | 25000 | 70 | " | " | " | 40 | 15 | ◎ |
| Example 67 | " | 9.1 | 23000 | " | " | " | " | 35 | " | " |
| Example 68 | 77.8 | 9.2 | 21000 | " | " | " | " | 30 | " | " |
| Example 69 | 76.2 | 9.1 | 23000 | " | " | " | " | 40 | 20 | " |
| Example 70 | 76.7 | " | 22000 | " | " | " | " | 45 | " | " |
| Example 71 | 75.7 | 9.0 | 25000 | " | " | " | " | " | " | ○ |
| Example 72 | 76.7 | 9.2 | 24000 | " | " | " | " | 50 | " | " |
| Example 73 | 71.0 | 9.1 | 23000 | " | " | " | " | 40 | " | ◎ |
| Example 74 | 77.3 | 9.0 | 24000 | " | " | " | " | 30 | 15 | " |

TABLE 4-continued

| | | | | | | | | | | | |
|---|---|---|---|---|---|---|---|---|---|---|---|
| Example 75 | 78.0 | 9.2 | 25000 | " | " | " | " | | 40 | " | " |
| C. example 7 | " | 9.3 | 24000 | " | " | " | 50/100 | | 20 | 10 | Δ |
| Example 76 | " | 9.2 | 23000 | " | " | " | 100/100 | | 50 | 20 | ◎ |
| Example 77 | " | 9.1 | 25000 | " | " | " | " | | 35 | 15 | " |
| Example 78 | " | " | " | " | | " | " | | 45 | 20 | " |
| | | | | | E D | | | 90/100 | 30 | 15 | |
| Example 79 | " | 9.0 | " | " | terne sheet | " | " | 100/100 | 50 | 25 | " |
| | | | | | E D | | | " | 35 | 20 | " |
| Example 80 | 75.7 | 9.2 | 23000 | " | terne sheet | " | " | | 40 | " | " |
| Example 81 | 77.3 | 9.1 | 24000 | " | " | " | " | | " | " | " |

*1 Figures in parentheses represent weight % based on the total of the emulsion polymer particles (A) and the high Tg emulsion polymer particles (B)
C. example: Comparative example
R. ex: Reference example

TABLE 5

Compounding in chipping-resistant aqueous coating compositions (4)

| | Synthetic rubber polymer emulsion (A) | | High Tg polymer emulsion (B) | | Urethane resin emulsion (C) | |
|---|---|---|---|---|---|---|
| Experiment No. | Kind | Use quantity (weight part)*1 | Kind | Use quantity (weight part)*1 | Kind | Use quantity (weight part)*1 |
| Example 82 | SN-562 | 133 (70) | R. ex 17 | 60 (30) | — | — |
| Example 83 | " | " | " | " | — | — |
| Example 84 | " | 95 (71.4) | R. ex 10 | 40 (28.6) | M-589 | 100 (42.9) |
| C. example 8 | " | 190 (100) | — | — | — | — |
| C. example 9 | " | 133 (100) | — | — | M-589 | 100 (30) |
| Example 85 | " | 76 (66.7) | R. ex 10- | 40 (33.3) | " | 133 (66.7) |
| Example 86 | " | 76 (57.1) | " | 60 (42.9) | " | 100 (42.9) |
| Example 87 | " | 95 (71.4) | " | 40 (28.6) | " | " |
| Example 88 | " | " | " | " | " | " |
| Example 89 | SN-534 | 104 (71.4) | " | " | " | " |
| Example 90 | J-1666 | 98 (71.4) | " | " | " | " |
| Example 91 | SK-80 | 96 (71.4) | " | " | " | " |
| Example 92 | L-2001 | 102 (71.4) | " | " | " | " |
| Example 93 | L-2337 | 100 (71.4) | " | " | " | " |
| Example 94 | Polylac | 104 (71.4) | " | " | " | " |
| Example 95 | LX-407c | 100 (71.4) | " | " | " | " |
| Example 96 | 1571 | 125 (71.4) | " | " | " | " |
| Example 97 | 1551 | 98 (71.4) | " | " | " | " |
| Example 98 | SN-562 | 95 (71.4) | R. ex 11 | " | " | " |
| C. example 10 | " | " | R. ex 12 | " | " | " |
| Example 99 | " | " | R. ex 14 | " | " | " |
| Example 100 | " | " | R. ex 15 | " | " | " |
| Example 101 | " | " | R. ex 16 | " | " | " |
| Example 102 | " | " | R. ex 17 | " | " | " |
| Example 103 | " | " | R. ex 18 | " | " | " |
| Example 104 | " | " | R. ex 19 | " | " | " |
| Example 105 | " | " | R. ex 10 | " | M-437 | 67 (42.9) |
| Example 106 | " | " | " | " | M-589 | 100 (42.9) |
| Example 107 | " | " | " | " | " | " |
| Example 108 | " | " | R. ex 17 | " | " | " |
| Example 109 | " | " | " | " | " | " |

| | Inorganic filler Calcium carbonate | | Color pigment Carbon black | pigment Barium metaborate | Crosslinking agent | |
|---|---|---|---|---|---|---|
| Experiment No. | Kind | Use quantity (weight part) | (weight part) | (weight part) | Kind | Use quantity (solid component) (weight part) |
| Example 82 | SL-700 | 218 | 3 | 12 | SU-125F | 4 (1) |
| Example 83 | " | " | " | " | ZnO | 2 (2) |
| Example 84 | " | " | " | " | — | — |
| C. example 8 | " | " | " | " | — | — |
| C. example 9 | " | " | " | " | — | — |
| Example 85 | " | " | " | " | — | — |
| Example 86 | " | " | " | " | — | — |
| Example 87 | " | 135 | " | " | — | — |
| Example 88 | " | 385 | " | " | — | — |
| Example 89 | " | 218 | " | " | — | — |
| Example 90 | " | " | " | " | — | — |
| Example 91 | " | " | " | " | — | — |
| Example 92 | " | " | " | " | — | — |
| Example 93 | " | " | " | " | — | — |
| Example 94 | " | " | " | " | — | — |
| Example 95 | " | " | " | " | — | — |
| Example 96 | " | " | " | " | — | — |
| Example 97 | " | " | " | " | — | — |
| Example 98 | " | " | " | " | — | — |
| C. Example 10 | " | " | " | " | — | — |
| Example 99 | " | " | " | " | — | — |

TABLE 5-continued

| | | | | | | | |
|---|---|---|---|---|---|---|---|
| Example 100 | " | " | " | " | — | — | |
| Example 101 | " | " | " | " | — | — | |
| Example 102 | " | " | " | " | — | — | |
| Example 103 | " | " | " | " | — | — | |
| Example 104 | " | " | " | " | — | — | |
| Example 105 | " | " | " | " | — | — | |
| Example 106 | " | " | " | " | SU-125F | 4 (1) | |
| Example 107 | " | " | " | " | ZnO | 2 (2) | |
| Example 108 | " | " | " | " | SU-125F | 4 (1) | |
| Example 109 | " | " | " | " | ZnO | 2 (2) | |

Physical properties of the chipping-resistant aqueous coating composition (4)

| | Characteristics of the coating composition | | | | Coat formation condition | | Physical properties of the coat of the coating composition | | | |
|---|---|---|---|---|---|---|---|---|---|---|
| | Solid | | | | | | | Chipping resistance | | Low-temperature |
| Experiment No. | component (weight %) | pH | Viscosity (cps) | PWC (weight %) | Base material | Baking condition | Adhesion to the base material | ordinary state (kg) | wet (kg) | impact resistance |
| Example 82 | 77.5 | 9.1 | 21000 | 70 | E D | low temperature | 100/100 | 45 30 | ⊚ | |
| Example 83 | 78.1 | " | 25000 | " | " | " | " | 40 | 25 | " |
| Example 84 | 70.8 | 9.2 | " | " | " | " | " | 40 | 20 | " |
| C. example 8 | 78.3 | 9.1 | " | " | " | " | 10/100 | 15 | 5 | X |
| C. example 9 | 71.1 | 9.2 | 24000 | " | " | " | 50/100 | 20 | 10 | ⊚ |
| Example 85 | 69.0 | 9.1 | 21000 | " | " | " | 100/100 | 45 | 25 | " |
| Example 86 | 70.9 | 9.2 | 20000 | " | " | " | " | 50 | " | " |
| Example 87 | 64.9 | " | 21000 | 60 | " | " | 90/100 | 30 | 15 | " |
| Example 88 | 78.6 | 9.0 | 25000 | 80 | " | " | 100/100 | 50 | 30 | ○ |
| Example 89 | 69.7 | 9.1 | 21000 | 70 | " | " | " | " | 25 | " |
| Example 90 | 70.6 | 9.2 | 22000 | " | " | " | " | 40 | 20 | ⊚ |
| Example 91 | 70.9 | " | 23000 | " | " | " | " | 45 | " | " |
| Example 92 | 70.0 | 9.1 | 21000 | " | " | " | " | 40 | 25 | " |
| Example 93 | 70.3 | 9.0 | " | " | " | " | " | " | 20 | " |
| Example 94 | 69.7 | " | 22000 | " | " | " | " | 50 | " | ○ |
| Example 95 | 70.3 | 9.2 | 23000 | " | " | " | " | " | 25 | " |
| Example 96 | 66.8 | 9.0 | 20000 | " | " | " | " | 40 | 20 | ⊚ |
| Example 97 | 70.6 | " | 21000 | " | " | " | " | 50 | " | " |
| Example 98 | 70.8 | 9.1 | 23000 | 70 | E D | Low temperature | 100/100 | 40 | 15 | ⊚ |
| C. example 10 | " | 9.2 | 25000 | " | " | " | 50/100 | 20 | 10 | Δ |
| Example 99 | 71.1 | 9.1 | 23000 | " | " | " | 100/100 | 45 | 20 | ⊚ |
| Example 100 | " | " | 22000 | " | " | " | " | 35 | 15 | " |
| Example 101 | " | 9.0 | 23000 | " | " | " | " | 45 | 20 | " |
| Example 102 | " | 9.2 | 25000 | " | " | " | " | 50 | 25 | " |
| Example 103 | " | " | 22000 | " | " | " | " | 40 | 20 | " |
| Example 104 | " | 9.1 | " | " | " | " | " | 35 | " | " |
| Example 105 | 76.4 | 9.2 | 25000 | " | " | " | " | 45 | 25 | " |
| Example 106 | 70.4 | 9.0 | 21000 | " | " | " | " | 50 | 30 | " |
| Example 107 | 71.2 | 9.1 | 22000 | " | " | " | " | 45 | 25 | " |
| Example 108 | 70.7 | " | 21000 | " | " | " | " | 60 | 35 | " |
| Example 109 | 71.2 | 9.2 | 23000 | " | " | " | " | 55 | 30 | " |

*1 Figures in parentheses represent weight % based on the total of the emulsion polymer particles (A) and the high Tg emulsion polymer particles (B)
C. example: Comparative example
R. ex: Reference example

TABLE 6

Synthetic rubber compolymer latex

| Trade name | Copolymer | Solid components (weight %) | PH | Viscosity (cps) | Particle size (μ) | Tg (°C.) |
|---|---|---|---|---|---|---|
| SN-562 | SBR | 52.5 | 7.1 | 170 | 0.16 | −40 |
| SN-534 | " | 51 | 8.5 | 200 | 0.15 | −35 |
| J-1666 | " | " | 7.0 | 430 | 0.17 | −48 |
| SK-80 | " | 52.1 | 9.1 | 130 | 0.20 | −65 |
| L-2001 | " | 49 | 7.8 | 120 | 0.16 | −41 |
| L-2337 | " | 50 | 8.0 | 90 | 0.13 | −41 |
| Polylac 707 | " | 48 | 9.3 | 50 | 0.20 | −21 |
| LX-407C | " | 50 | 7.0 | 100 | 0.17 | −11 |
| Nipol 1571 | NBR | 40 | 8.0 | 20 | 0.12 | −30 |
| Nipol 1551 | " | 51 | 9.5 | 50 | 0.18 | −39 |

TABLE 7

| | Urethan resin emulsion | | | | | | | |
|---|---|---|---|---|---|---|---|---|
| | | | | | Physical properties of the film | | | |
| | | | | | Yield point | | Break point | |
| Trade name | Solid component (weight %) | pH | Viscosity (cps) | Particle size ($\mu$) | Yield value (kg/cm$^2$) | Elongation (%) | 100% modulus (kg/cm$^2$) | Tensile strength (kg/cm$^2$) | Elongation (%) |
| M-437 | 45 | 7.0 | 45 | 0.18 | 76 | 15 | 55 | 108 | 540 |
| M-589 | 30 | 7.0 | 1600 | 0.12 | 113 | 10 | 106 | 205 | 340 |

We claim:

1. An aqueous coating composition comprising two different fine polymer particles (A) and (B) dispersed in an aqueous medium and in an inorganic filler, wherein said fine polymer particles comprise particles
   (A) 50 to 95 weight % of synthetic rubber emulsion polymer particles containing 30 to 90 weight % of a conjugated diolefin unit and having a glass transition temperature of $-10°$ C. or less, and
   (B) 5 to 50 weight % of emulsion polymer particles containing 30 to 99.9 weight % of the unit represented by the formula

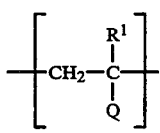

wherein, R$^1$ represents a hydrogen atom or methyl group, and Q represents COOR$^2$,

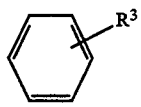

or —CN wherein R$^2$ represents a lower alkyl group and R$^3$ represents a hydrogen atom or lower alkyl group, and having a glass transition temperature of at least 20° C.

2. The composition of claim 1 wherein said synthetic rubber emulsion polymer particles (A) have a glass transition temperature of $-20°$ to $-80°$ C.

3. The composition of claim 1 wherein said synthetic rubber emulsion polymer particles (A) contain 40 to 80 weight % of said conjugated diolefin unit.

4. The composition of claim 1 wherein said synthetic rubber emulsion polymer particles (A) are those obtained by aqueous emulsion polymerizing under pressure (a-1) a conjugated diolefinic monomer with (a-2) an aromatic vinyl monomer, a vinyl cyanide monomer or a mixture thereof.

5. The composition of claim 4 wherein said conjugated diolefinic monomer (a-1) is butadiene.

6. The composition of claim 4 wherein said aromatic vinyl monomer (a-2) is styrene and said vinyl cyanide monomer (a-2) is acrylonitrile.

7. The composition of claim 1 wherein said synthetic rubber emulsion polymer particles (A) are those obtained by aqueous emulsion polymerizing under pressure
   (a-1) a conjugated diolefinic monomer, and
   (a-2) an aromatic vinyl monomer, a vinyl cyanide monomer, or a mixture thereof, together with (a-3) a carboxyl group-containing ethylenic monomer.

8. The composition of claim 7 wherein said carboxyl group-containing ethylenic monomer (a-3) is acrylic acid, methacrylic acid or itaconic acid.

9. The composition of claim 4 wherein said synthetic rubber emulsion polymer particles (A) are those obtained by emulsion polymerizing 40 to 80 weight % of said monomer (a-1) and 19.5 to 55 weight % of said monomer (a-2).

10. The composition of claim 1 wherein said synthetic rubber emulsion polymer particles (A) have an average particle size in the range of 0.05 to 0.5 micron.

11. The composition of claim 1 wherein said emulsion polymer particles (B) contain 35 to 99.5 weight % of the unit represented by the formula (I).

12. The composition of claim 1 wherein said emulsion polymer particles (B) contain 0.1 to 10 weight % of a unit derived from a carboxyl group-containing ethylenic monomer.

13. The composition of claim 1 wherein said emulsion polymer particles (B) further contain 1 to 20 weight % of a unit derived from a hydroxyl group-containing ethylenic monomer.

14. The composition of claim 1 wherein said emulsion polymer particles (B) are those prepared by emulsion polymerizing
   (b-1) an ethylenic monomer which is represented by the formula

wherein R$^1$ and Q are as defined in claim 1, and whose homopolymer is hydrophobic and has a Tg of 40° C. or more with
   (b-2) a carboxyl group-containing ethylenic monomer.

15. The composition of claim 14 wherein said monomer (b-1) is methyl methacrylate, isobutyl methacrylate, styrene or acrylonitrile.

16. The composition of claim 14 wherein said monomer (b-2) is acrylic acid, methacrylic acid or itaconic acid.

17. The composition of claim 1 wherein said emulsion polymer particles (B) are those prepared by emulsion polymerizing
   (b-1) an ethylenic monomer which is represented by the formula

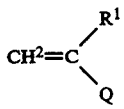

wherein R¹ and Q are as defined in claim 1, and whose homopolymer is hydrophobic and has a Tg of 40° C. or more, and (b-2) a carboxyl group-containing ethylenic monomer, together with (b-3) a hydroxyl group-containing ethylenic monomer.

18. The composition of claim 17 wherein said monomer (b-3) is a $C_{2-4}$ hydroxyalkyl ester of (meth)acrylic acid.

19. The composition of claim 1 wherein said emulsion polymer particles (B) have a glass transition temperature of from 20° C. to under 60° C.

20. The composition of claim 14 wherein said emulsion polymer particles (B) are those obtained by emulsion polymerizing 35 to 80 weight % of said monomer (b-1) and 0.1 to 10 weight % of said monomer (b-2).

21. The composition of claim 1 wherein said emulsion polymer particles (B) have a glass transition temperature of 60° C. or more.

22. The composition of claim 21 wherein said emulsion polymer particles (B) are those obtained by emulsion polymerizing 45 to 99.5 weight % of said monomer (b-1), 0.1 to 10 weight % of said monomer (b-2), 0 to 30 weight % of said monomer (b-3), and 0 to 30 weight % of said monomer (b-4) based on the total quantity of said monomers (b-1) to (b-4).

23. The composition of claim 1 wherein said emulsion polymer particles (B) have an average particle size in the range of 0.05 to 0.5 micron.

24. The composition of claim 1 wherein said fine polymer particles comprise 55 to 90 weight % of said synthetic rubber emulsion polymer particles (A) and 10 to 45 weight % of said emulsion polymer particles (B).

25. The aqueous coating composition of claim 1 wherein said fine polymer particles further contain (C) 3 to 100 weight % of urethane emulsion polymer particles based on the total quantity of said emulsion polymer particles (A) and (B).

26. The composition of claim 25 wherein said urethane emulsion polymer particles (C) are those obtained by reacting a chain extender with an urethane prepolymer having a terminal isocyanate group obtained from a polyisocyanate compound and a polyol compound and then emulsifying the resultant product.

27. The composition of claim 26 wherein said urethane emulsion polymer particles (C) are nonionic or anionic urethane emulsion polymer particles.

28. The composition of claim 25 wherein said urethane emulsion polymer particles (C) are such that the larger of the tensile strength at 100% elongation of a film formed from an urethane polymer emulsion containing said polymer particles and the yield value of the film before 100% elongation is 20 kg/cm² or more.

29. The composition of claim 25 wherein said urethane emulsion polymer particles (C) have an average particle size in the range of 0.05 to 0.5 micron.

30. The composition of claim 25 which contains 4 to 90 weight % of said urethane emulsion polymer particles (C) based on the total quantity of said emulsion polymer particles (A) and (B).

31. The composition of claim 1 wherein said inorganic filler is selected form the group consisting of calcium carbonate, silica, alumina, krolin, clay, talc, diatom earth, mica, aluminum hydroxide, glass powder, barium sulfate and magnesium carbonate.

32. The composition of claim 1 which contains said inorganic filler in the range of 100 to 390 weight parts per 100 weight parts of the solid components of the fine polymer particles.

33. The composition of claim 1 wherein said inorganic filler has an average particle size in the range of 1 to 50 microns.

34. The composition of claim 1 which is a chipping-resistant aqueous coating composition.

35. The composition of claim 34 wherein said synthetic rubber emulsion polymer particles (A) are those obtained by emulsion polymerizing 40 to 80 weight % of said monomer (a-1), 19.5 to 55 weight % of said monomer (a-2) and 0.1 to 10 weight % of said monomer (a-3) based on the total quantity of said monomers (a-1) to (a-3).

36. The composition of claim 1 wherein said synthetic rubber emulsion polymer particles (A) are those obtained by aqueous emulsion polymerizing under pressure (a-1) a conjugated diolefinic monomer, (a-2) an aromatic vinyl monomer, a vinyl cyanide monomer, or a mixture thereof, and (a-3) a carboxyl group-containing ethylenic monomer, together with (a-4) another copolymerizable monomer.

37. The composition of claim 36 wherein said synthetic rubber emulsion polymer particles (A) are those obtained by emulsion polymerizing 40 to 80 weight % of said monomer (a-1), 19.5 to 55 weight % of said monomer (a-2), 0.1 to 10 weight % of said monomer (a-3), and 0 to 20 weight % of said monomer (a-4) based on the total quantity of said monomers (a-1) to (a-4).

38. The composition of claim 17 wherein said emulsion polymer particles (B) are those obtained by emulsion polymerizing 35 to 80 weight % of said monomer (b-1), 0.1 to 10 weight % of said monomer (b-2) and 0 to 30 weight % of said monomer (b-3) based on the total quantity of said monomers (b-1) to (b-3).

39. The composition of claim 1 wherein said emulsion polymer particles (B) are those prepared by emulsion polymerizing (b-1) an ethylenic monomer which is represented by the formula $$CH_2=C\begin{matrix}R^1\\ \diagdown\\ Q\end{matrix} \qquad (II)$$

wherein R¹ and Q are as defined in claim 1, and whose homopolymer is hydrophobic and has a Tg of 40° C. or more (b-2) a carboxyl group-containing ethylenic monomer, and (b-3) a hydroxyl group-containing ethylenic monomer, together with (b-4) another copolymerizable monomer.

40. The composition of claim 39 wherein said emulsion polymer particles (B) are those obtained by emulsion polymerizing 35 to 80 weight % of said monomer (b-1), 0.1 to 10 weight % of said monomer (b-2), 0 to 30 weight % of said monomer (b-3), and 19.5 to 64.5 weight % of said monomer (b-4) based on the total quantity of said monomers (b-1) to (b-4).

41. An aqueous coating composition comprising two different fine polymer particles (A) and (B) dispersed in an aqueous medium and in an inorganic filler, wherein said fine polymer particles comprise particles
  (A) 50 to 95 weight % of synthetic rubber emulsion polymer particles containing 30 to 90 weight % of a conjugated diolefin unit and having a glass transition temperature of −20° to −80° C., wherein said synthetic rubber emulsion polymer particles (A) are those obtained by aqueous emulsion polymerizing under pressure
  (a-1) a conjugated diolefinic monomer with
  (a-2) an aromatic vinyl monomer, a vinyl cyanide monomer or a mixture thereof, and
  (B) 5 to 50 weight % of emulsion polymer particles containing 30 to 99.9 weight % of the unit represented by the formula

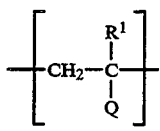

wherein said emulsion polymer particles (B) are those prepared by emulsion polymerizing
  (b-1) an ethylenic monomer which is represented by the formula

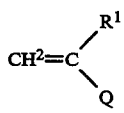

wherein $R^1$ represents a hydrogen atom or methyl group, and Q represents $COOR^2$,

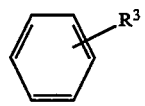

or —CN wherein $R^2$ represents a lower alkyl group and $R^3$ represents a hydrogen atom or a lower alkyl group, whose homopolymer is hydrophobic and has a Tg of 30° C. or more with
  (b-2) a carboxyl group-containing ethylenic monomer.

42. The composition of claim 41 wherein said synthetic rubber emulsion polymer particles (A) are those obtained by emulsion polymerizing 40 to 80 weight % of said monomer (a-1) and 19.5 to 55 weight % of said monomer (a-2), and
  wherein said emulsion polymer particles (B) are those obtained by emulsion polymerizing 35 to 80 weight % of said monomer (b-1) and 0.1 to 10 weight % of said monomer (b-2).

43. An aqueous coating composition comprising two different fine polymer particles (A) and (B) dispersed in an aqueous medium and in an inorganic filler, wherein said fine polymer particles comprise particles
  (A) 50 to 95 weight % of synthetic rubber emulsion polymer particles containing 30 to 90 weight % of a conjugated diolefin unit and having a glass transition temperature of −20° to −80° C., wherein said synthetic rubber emulsion polymer particles (A) are those obtained by aqueous emulsion polymerizing under pressure
  (a-1) a conjugated diolefinic monomer, and
  (a-2) an aromatic vinyl monomer, a vinyl cyanide monomer, or a mixture thereof, together with
  (a-3) a carboxyl group-containing ethylenic monomer, and
  (B) 5 to 50 weight % of emulsion polymer particles containing 30 to 99.9 weight % of the unit represented by the formula

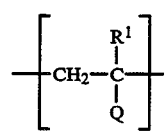

wherein said emulsion polymer particles (B) are those prepared by emulsion polymerizing
  (b-1) an ethylenic monomer which is represented by the formula

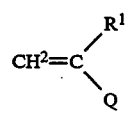

wherein $R^1$ represents a hydrogen atom or methyl group, and Q represents $COOR^2$,

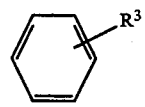

or —CN wherein $R^2$ represents a lower alkyl group and $R^3$ represents a hydrogen atom or a lower alkyl group, whose homopolymer is hydrophobic and has a Tg of 30° C. or more and
  (b-2) a carboxyl group-containing ethylenic monomer, together with
  (b-3) a hydroxyl group-containing ethylenic monomer.

44. The composition of claim 43 wherein said synthetic rubber emulsion polymer particles (A) are those obtained by emulsion polymerizing 40 to 80 weight % of said monomer (a-1), 19.5 to.55 weight % of said monomer (a-2), 0.1 to 10 weight % of said monomer (a-3), and
  wherein said emulsion polymer particles (B) are those obtained by emulsion polymerizing 35 to 80 weight % of said monomer (b-1), 0.1 t0 10 weight % of said monomer (b-2) and 0 to 30 weight % of said monomer (b-3).

* * * * *